Feb. 15, 1955

C. FORNEY 2,702,058

MACHINE ASSEMBLY FOR THE PRODUCTION OF CLOTHESPINS

Filed Feb. 25, 1948

Inventor
Charles Forney,
Flocks and Simon
Attorneys

Feb. 15, 1955 C. FORNEY 2,702,058
MACHINE ASSEMBLY FOR THE PRODUCTION OF CLOTHESPINS
Filed Feb. 25, 1948 24 Sheets-Sheet 2

Inventor
Charles Forney,
Flocks and Simon
Attorney

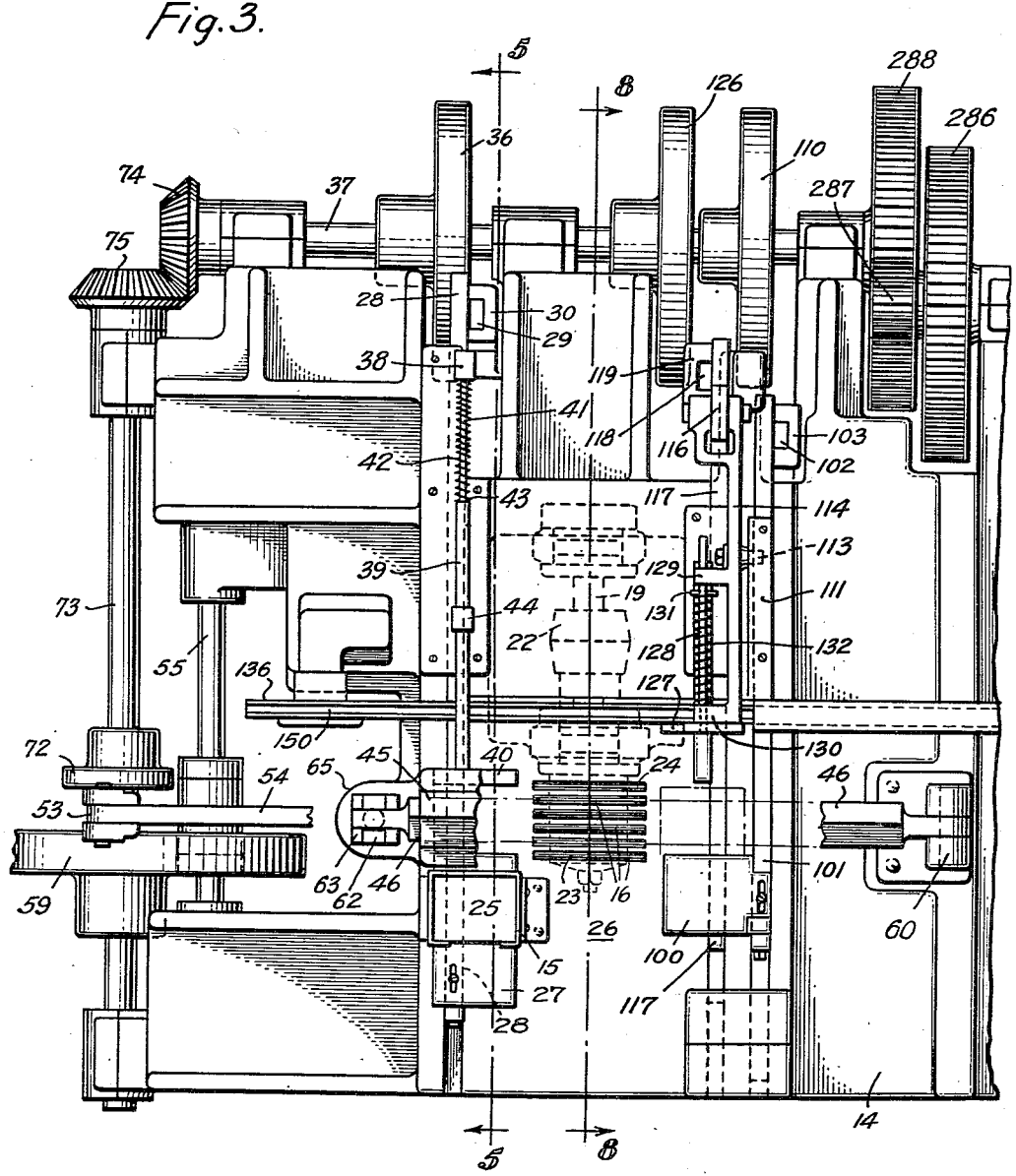

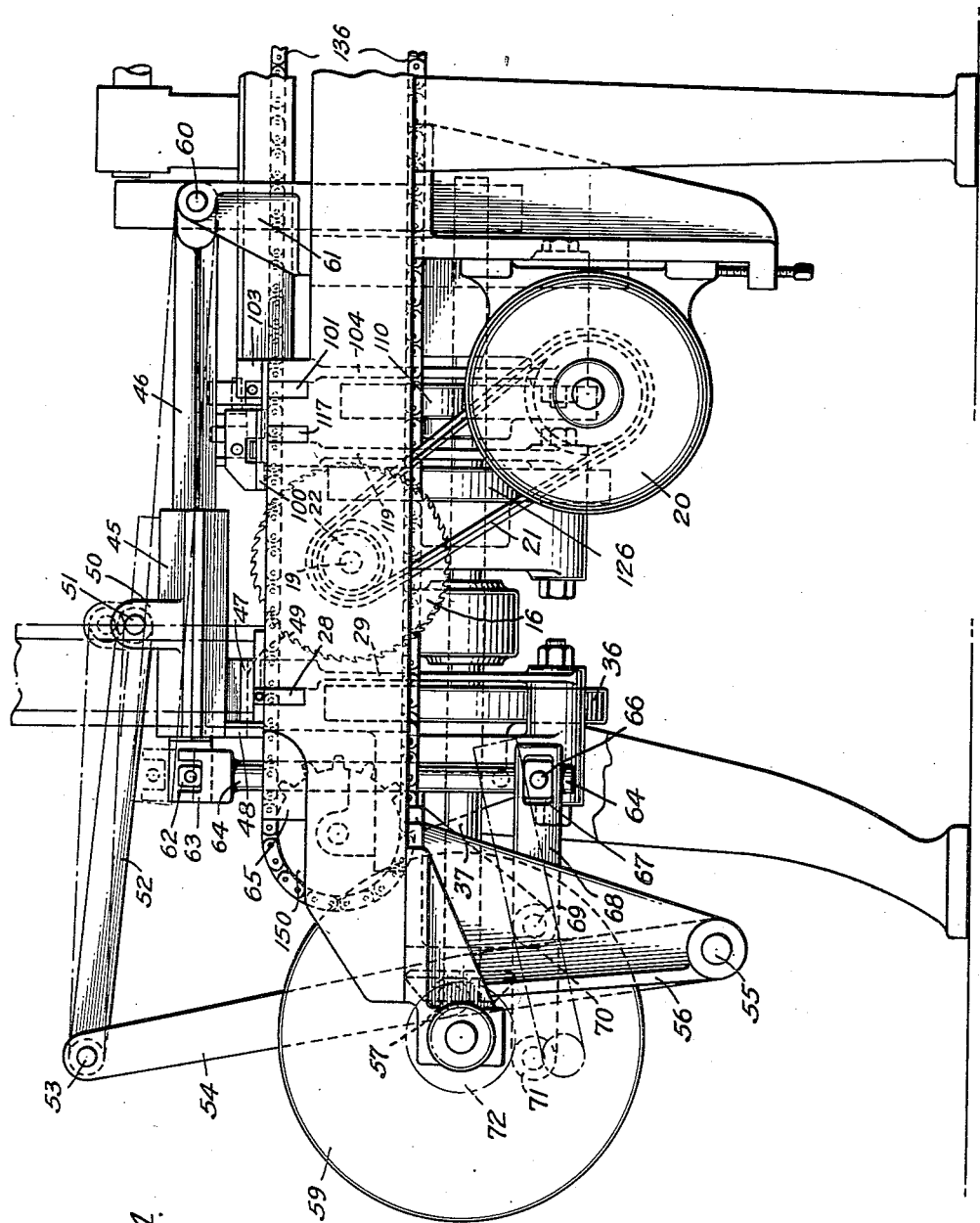

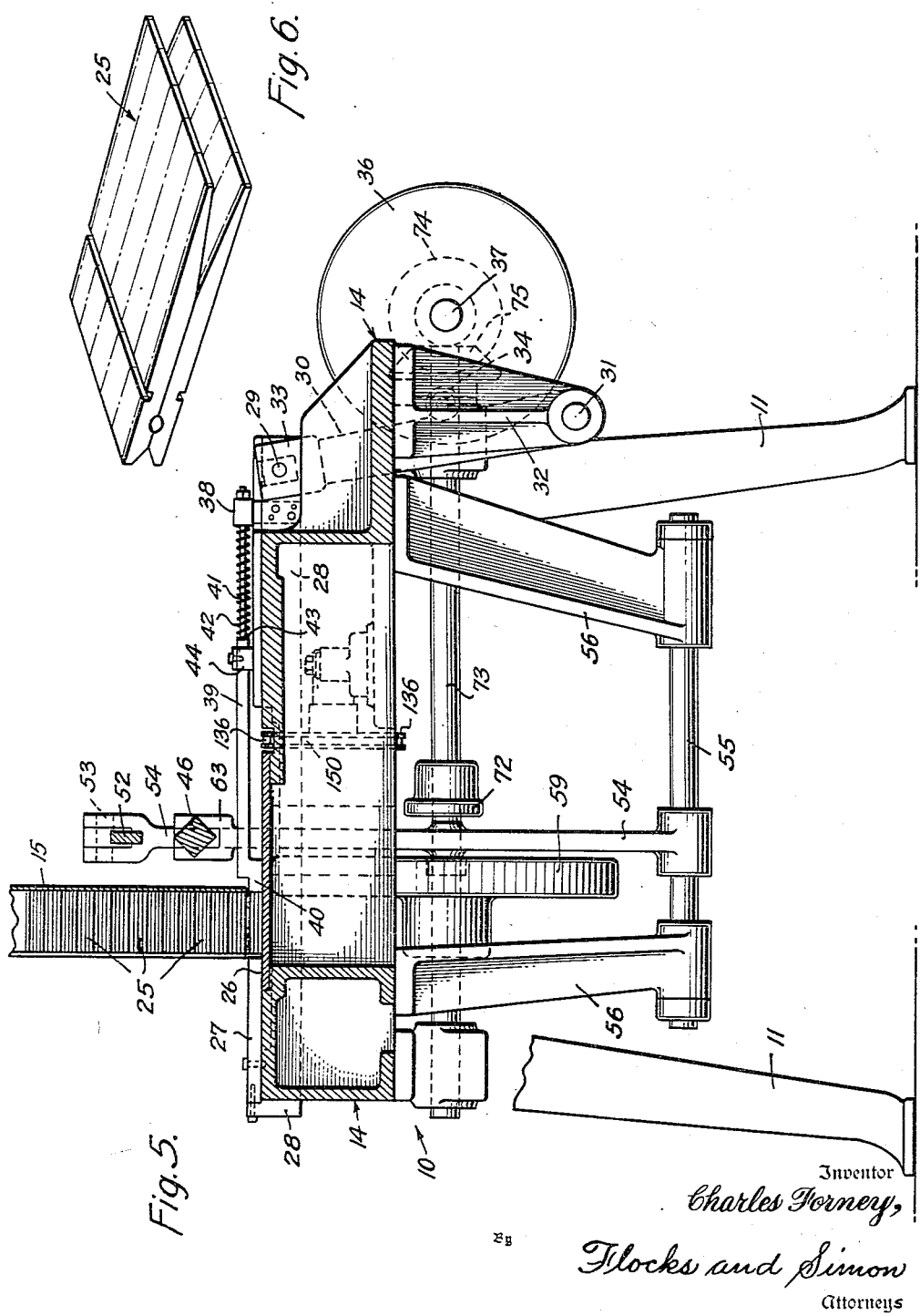

Feb. 15, 1955     C. FORNEY     2,702,058
MACHINE ASSEMBLY FOR THE PRODUCTION OF CLOTHESPINS
Filed Feb. 25, 1948     24 Sheets-Sheet 6

Inventor
Charles Forney,
By
Flocks and Simon
Attorneys

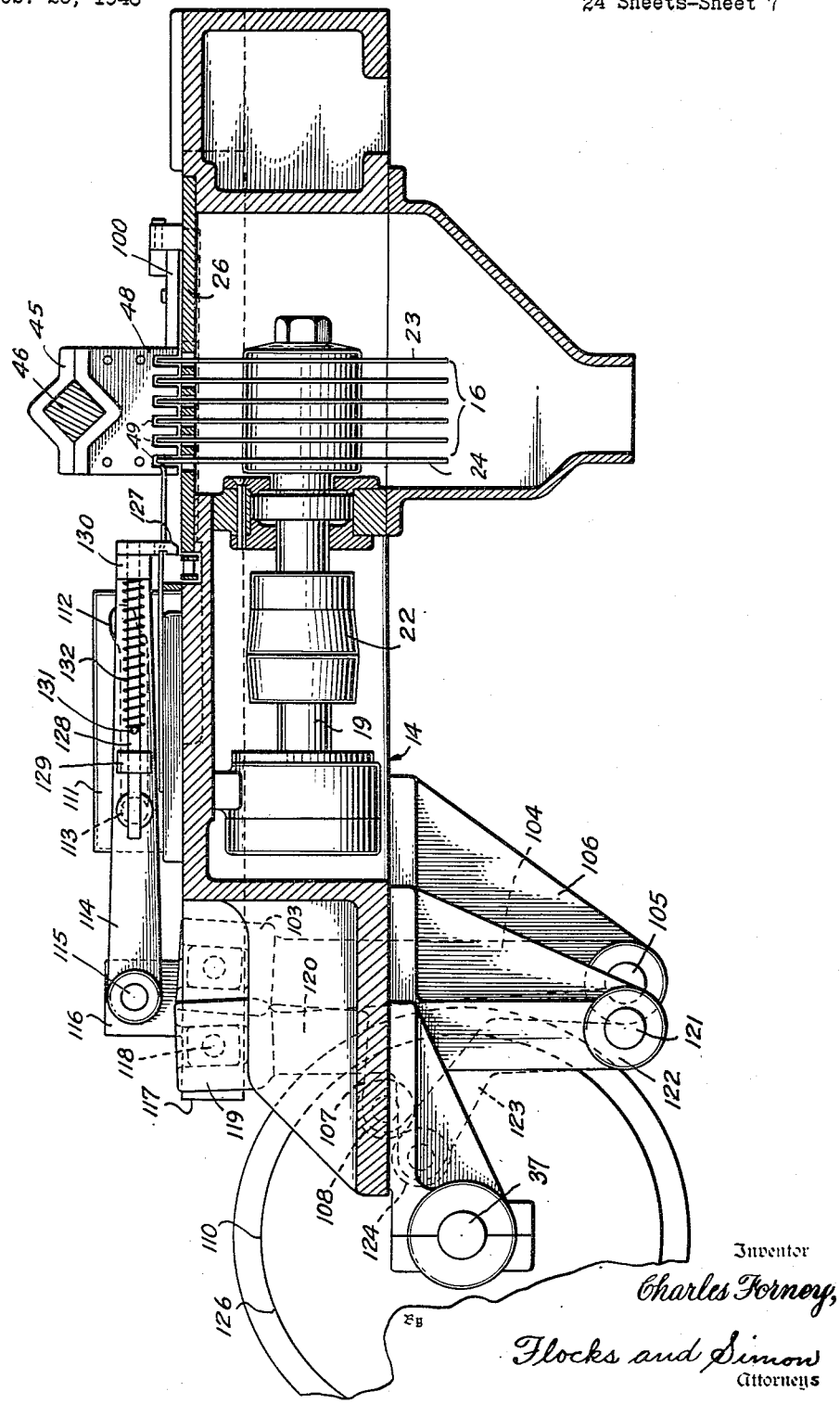

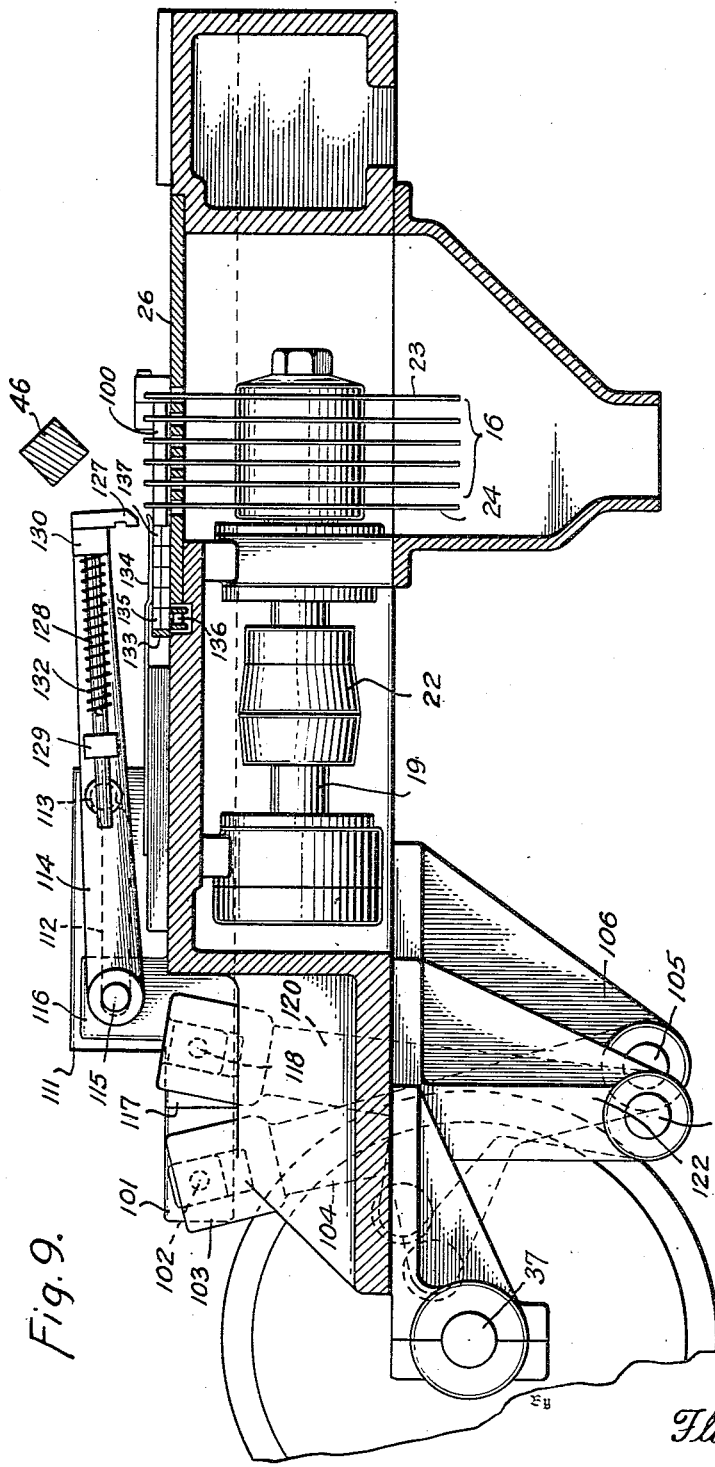

Feb. 15, 1955 C. FORNEY 2,702,058
MACHINE ASSEMBLY FOR THE PRODUCTION OF CLOTHESPINS
Filed Feb. 25, 1948 24 Sheets-Sheet 9

Inventor
Charles Forney,
Flocks and Simon
Attorneys

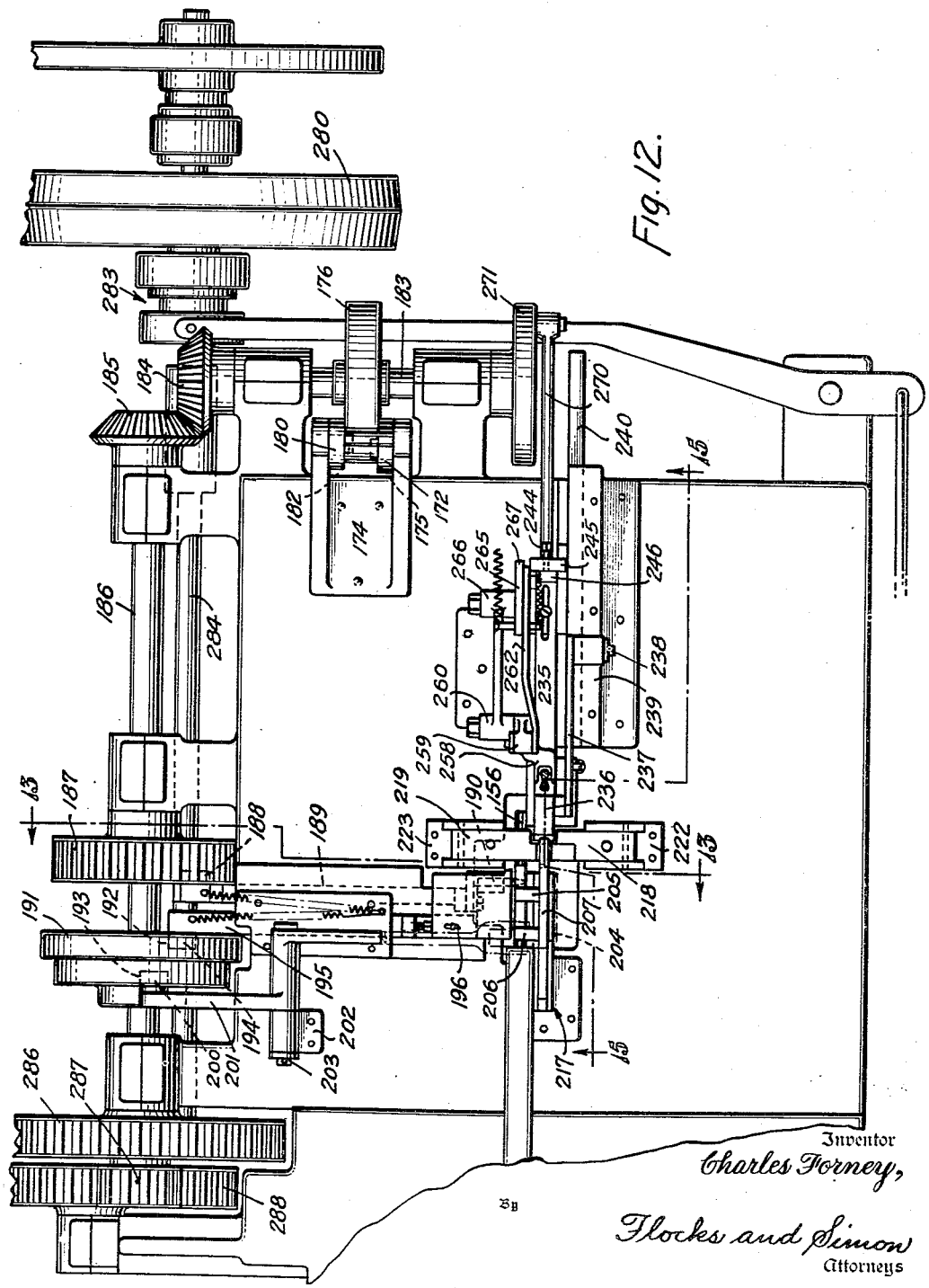

Feb. 15, 1955 C. FORNEY 2,702,058
MACHINE ASSEMBLY FOR THE PRODUCTION OF CLOTHESPINS
Filed Feb. 25, 1948 24 Sheets-Sheet 11

Inventor
Charles Forney

Flocks and Simon
Attorneys

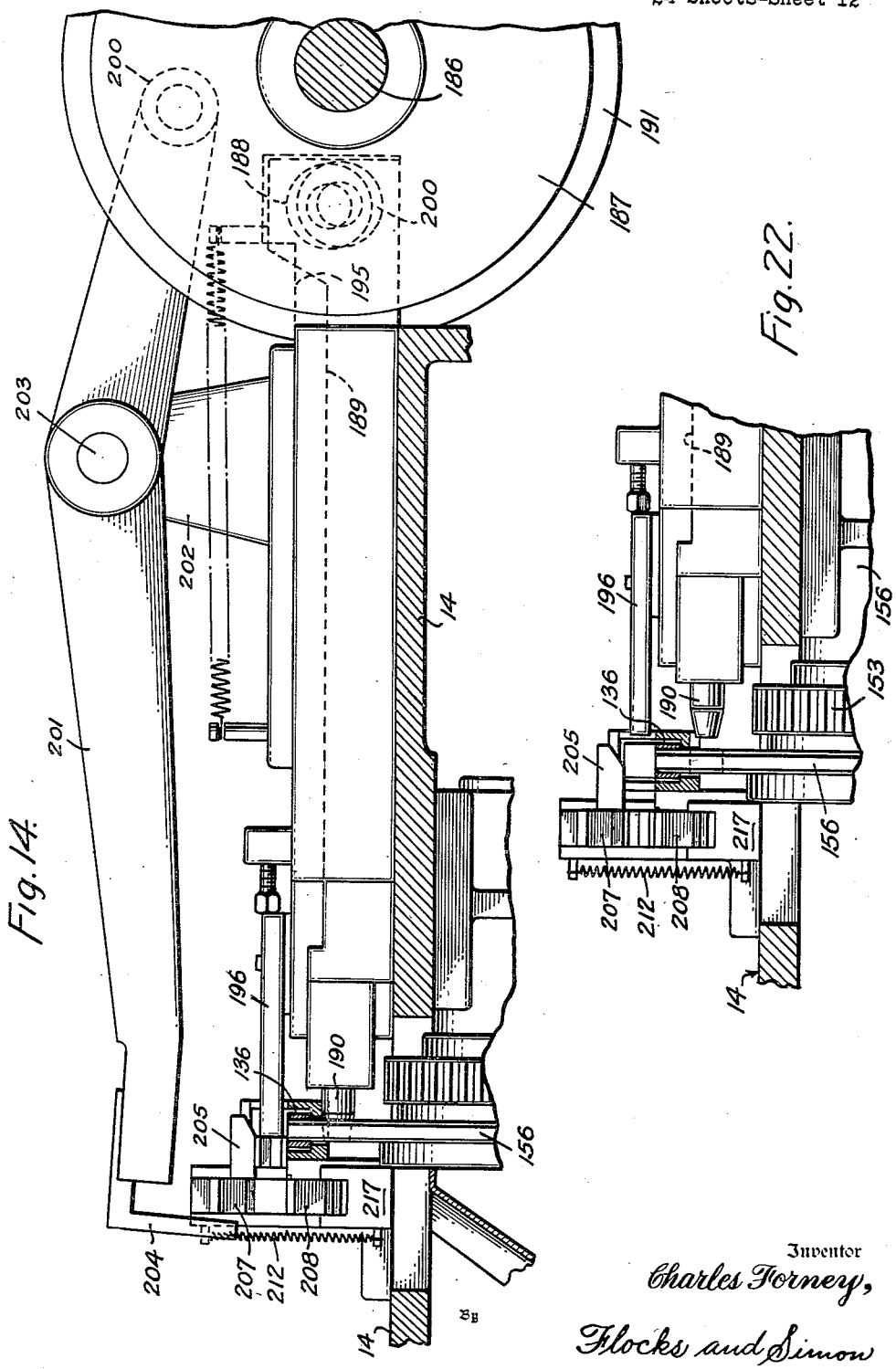

Feb. 15, 1955     C. FORNEY     2,702,058
MACHINE ASSEMBLY FOR THE PRODUCTION OF CLOTHESPINS
Filed Feb. 25, 1948     24 Sheets-Sheet 13
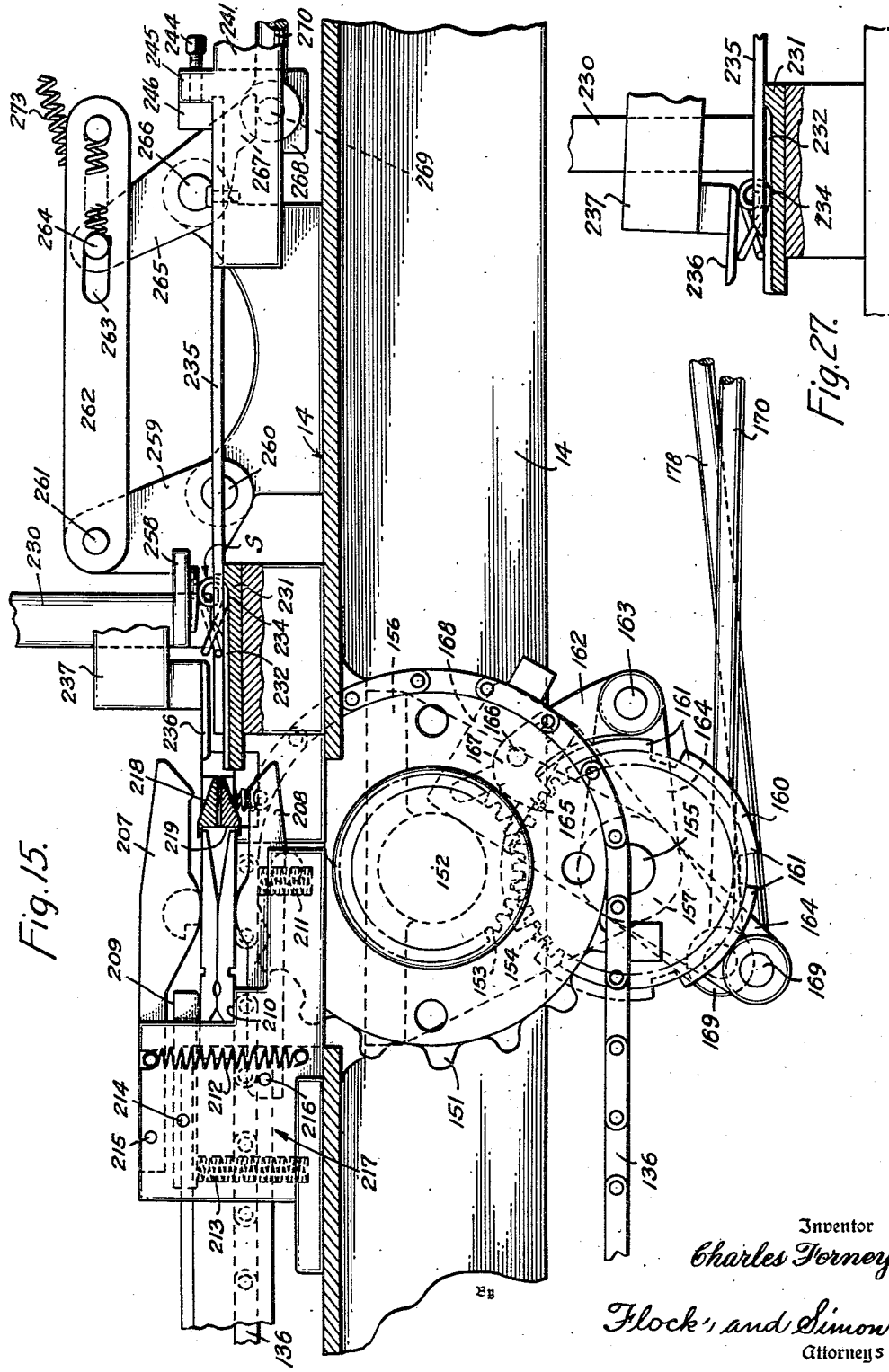
Inventor
Charles Forney,
Flock, and Simon
Attorneys Feb. 15, 1955  C. FORNEY  2,702,058
MACHINE ASSEMBLY FOR THE PRODUCTION OF CLOTHESPINS
Filed Feb. 25, 1948  24 Sheets-Sheet 14
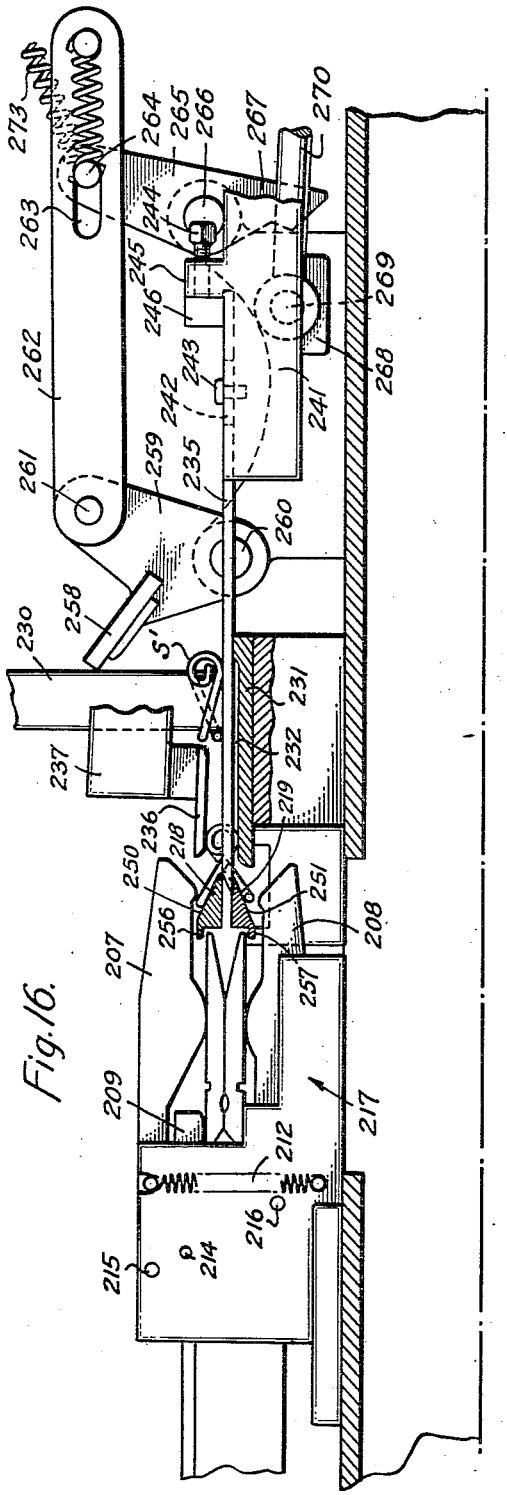
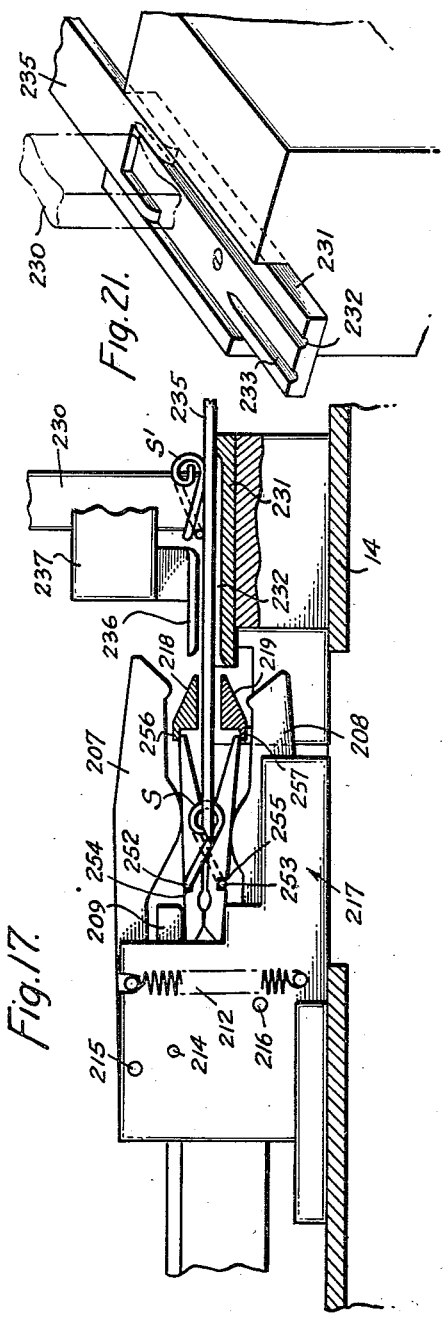
Inventor
Charles Forney,
By
Flocks and Simon
Attorney

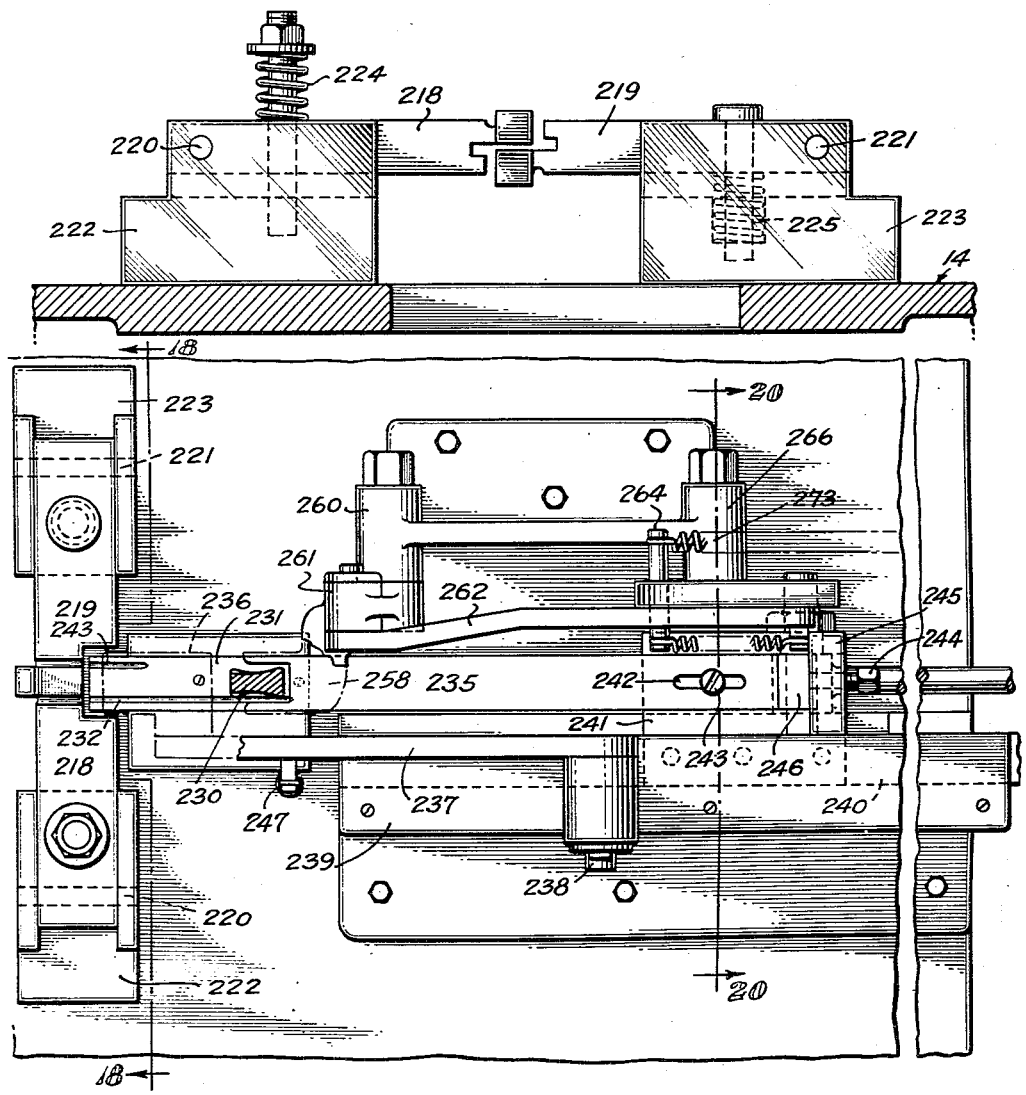

Feb. 15, 1955  C. FORNEY  2,702,058
MACHINE ASSEMBLY FOR THE PRODUCTION OF CLOTHESPINS
Filed Feb. 25, 1948  24 Sheets-Sheet 16

Inventor
Charles Forney
Flocks and Simon
Attorney

Feb. 15, 1955 C. FORNEY 2,702,058
MACHINE ASSEMBLY FOR THE PRODUCTION OF CLOTHESPINS
Filed Feb. 25, 1948 24 Sheets-Sheet 17
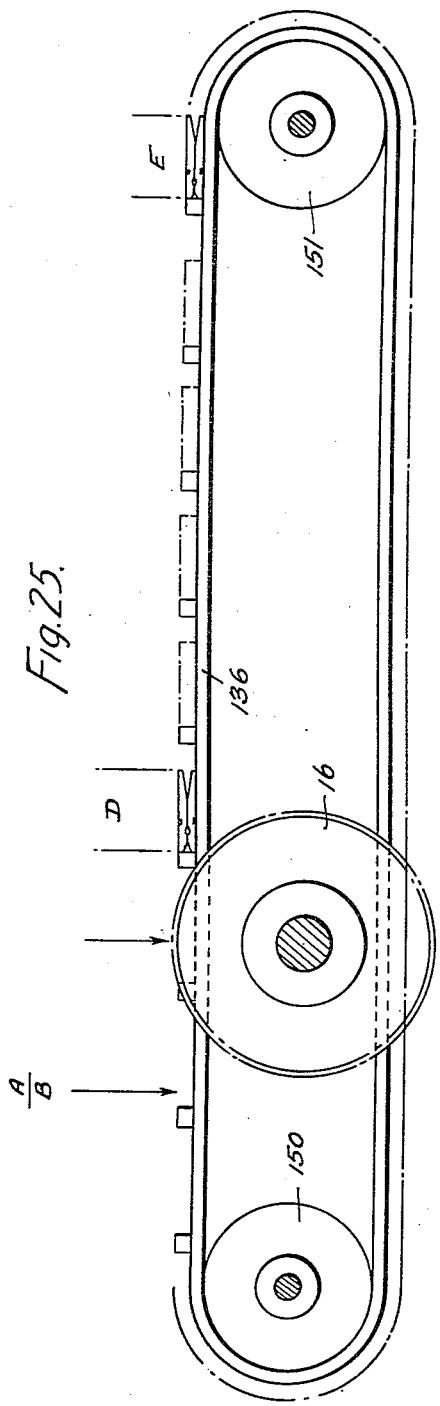
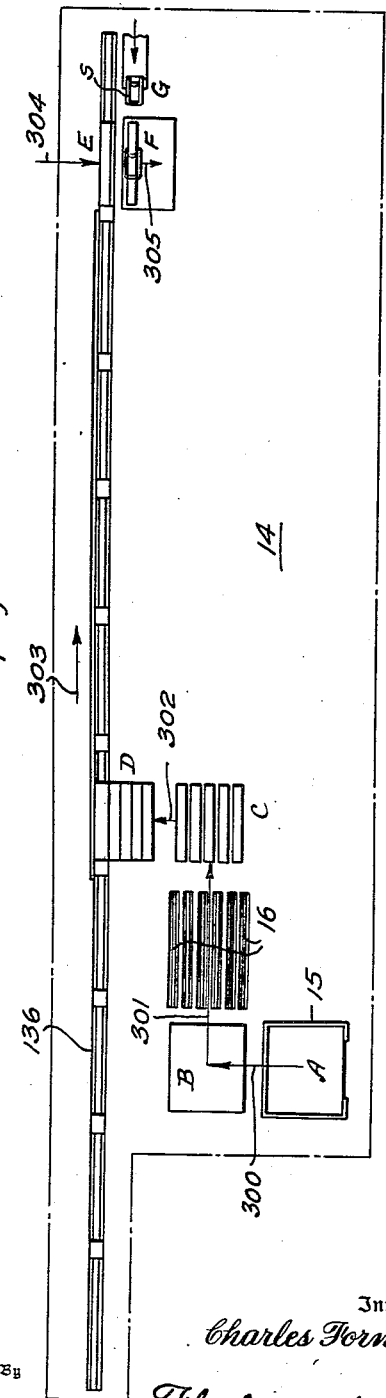
Inventor
Charles Forney,
By
Flocks and Simon
Attorneys Feb. 15, 1955     C. FORNEY     2,702,058
MACHINE ASSEMBLY FOR THE PRODUCTION OF CLOTHESPINS
Filed Feb. 25, 1948     24 Sheets-Sheet 18

Inventor
Charles Forney,
By Flocks and Simon
Attorneys

Feb. 15, 1955   C. FORNEY   2,702,058
MACHINE ASSEMBLY FOR THE PRODUCTION OF CLOTHESPINS
Filed Feb. 25, 1948   24 Sheets-Sheet 19
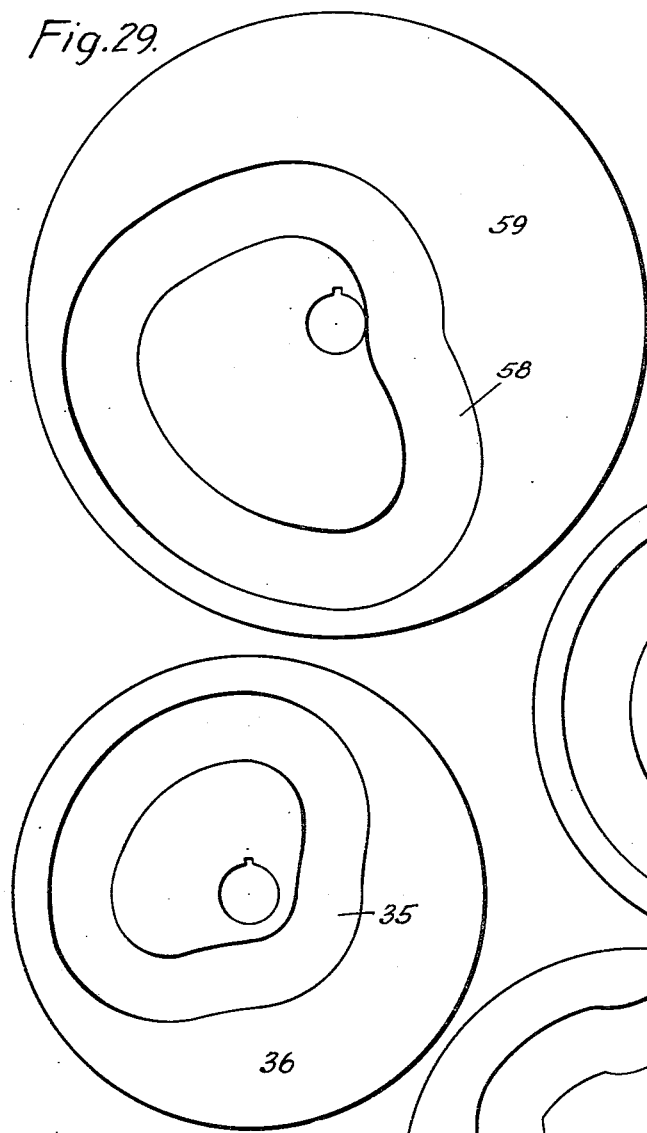
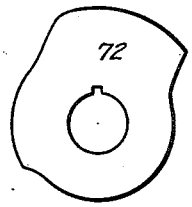
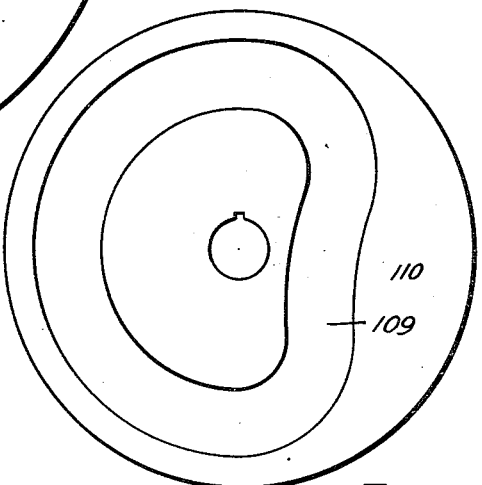
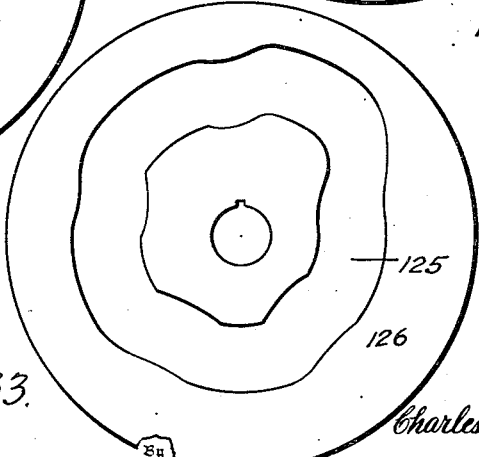
Inventor
Charles Forney
Flocks and Simon
Attorney Feb. 15, 1955 C. FORNEY 2,702,058
MACHINE ASSEMBLY FOR THE PRODUCTION OF CLOTHESPINS
Filed Feb. 25, 1948 24 Sheets-Sheet 20

Inventor
Charles Forney,
By
Flocks and Simon
Attorneys

Feb. 15, 1955  C. FORNEY  2,702,058
MACHINE ASSEMBLY FOR THE PRODUCTION OF CLOTHESPINS
Filed Feb. 25, 1948  24 Sheets-Sheet 22

Inventor
Charles Forney,
By Flocks and Simon
Attorneys

Feb. 15, 1955     C. FORNEY     2,702,058
MACHINE ASSEMBLY FOR THE PRODUCTION OF CLOTHESPINS
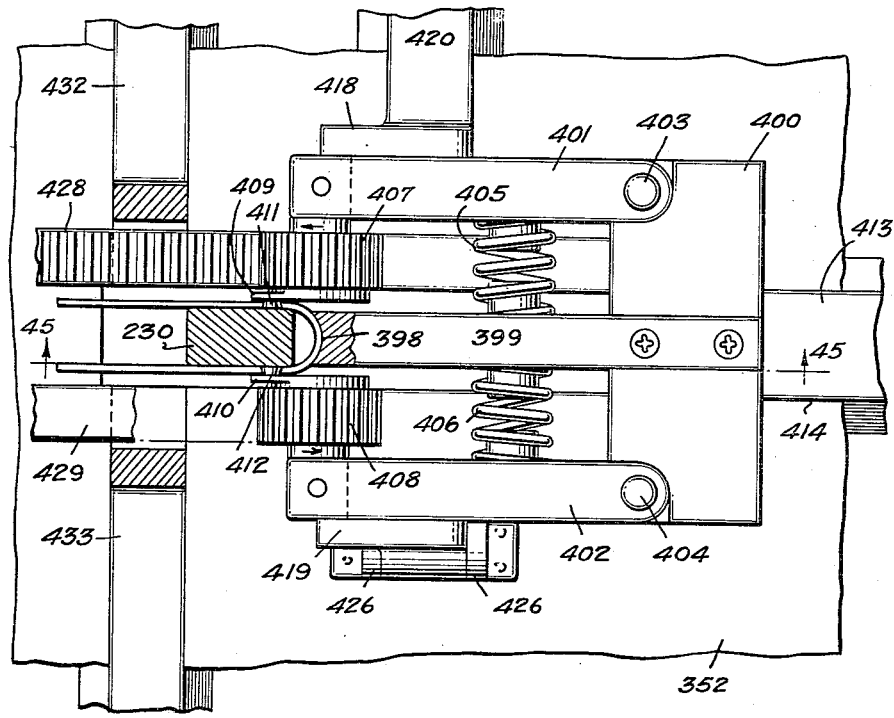
Fig.44.
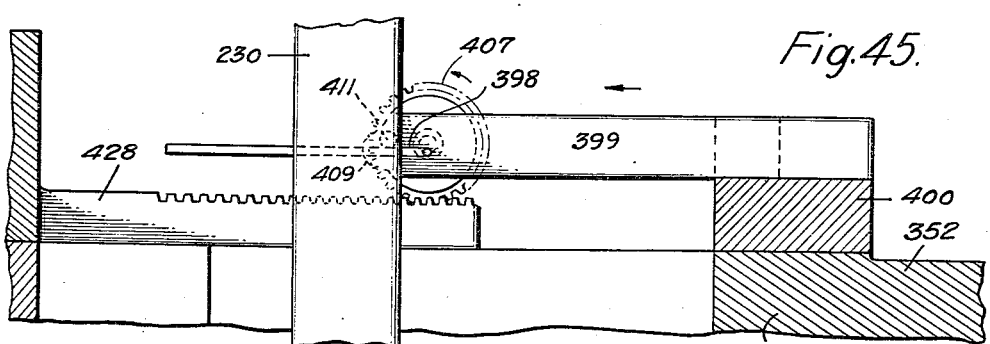
Fig.45.
Fig.46.
Inventor
Charles Forney,
By Flocks and Simon
Attorneys

United States Patent Office 2,702,058
Patented Feb. 15, 1955

2,702,058

MACHINE ASSEMBLY FOR THE PRODUCTION OF CLOTHESPINS

Charles Forney, Norfolk, Va., assignor to The Diamond Match Company, New York, N. Y., a corporation of Delaware Application February 25, 1948, Serial No. 10,855

16 Claims. (Cl. 143—48)

The present invention relates to the sawing and assembling of clothes pins. More particularly the present invention relates to the production from blanks of a size sufficient to produce several pin assemblies of the type of clothes pin comprising two complementary portions united by a spring wire so that the noses of said pins are normally biased towards each other thereby.

In U. S. Patent 1,830,021, granted November 3, 1931, to C. Forney, there is disclosed a clothes pin assembling machine for assembling clothes pins of the general character just previously described. The Forney machine required the manual assembly of each of the complementary pin portions and the positioning of these pin portions within a magazine. The machine shown in this patent also was only generally capable of assembling a type of pin wherein the two halves of the pin were capable of lateral displacement or twisting relative to each other.

It is one object of the present invention to provide for the assembling of clothes pins or the like and for the sawing of blanks capable of producing a plurality of pin assemblies, together with the feeding of the sawn blanks or pin assemblies to the assembly point.

A second object of the present invention is to provide a novel machine including a plurality of transfer mechanisms capable of moving pin blanks through a plurality of saws so as to saw the blanks into a plurality of pin assemblies and to forward the sawn blanks or pin assemblies to an assembly point wherein spring wire is assembled with the pin in timed relation.

A third general object of the present invention is to provide a machine which requires a minimum of manual assembly of pins or the like and which is entirely automatic in operation so that the wire fastening or spring means for the pins is produced in timed relation and fed to the assembling point in timed relation with the pin blanks.

A fourth general object of the present invention is to provide means for positively moving and positioning of the various elements of the pins and of the wire for positive and rapid assembly in timed relation.

Other objects and the nature and advantages of the instant invention will be apparent from the following description taken in conjunction with the accompanying drawings, wherein:

Figure 3 is an enlarged plan view of a portion of the machine.

Figure 4 is an enlarged side elevation of the portion of the machine shown in Figure 3 with the parts in a different position.

Figure 5 is a section taken approximately on the line 5—5 of Figure 3.

Figure 6 is a perspective view of one of the blanks being treated.

Figure 8 is a section taken approximately on the line 8—8 of Figure 3.

Figure 9 is a view similar to Figure 8 with the parts in a different position.

Figure 10 is a view similar to Figures 8 and 9 with the apparatus in a third position.

Figure 11 is an enlarged side elevation of a portion of the machine.

Figure 12 is a plan view of the portion of the machine shown in Figure 11.

Figure 14 is a view similar to Figure 13 with the parts in a different position.

Figure 15 is a section taken approximately on the line 15—15 of Figure 12.

Figure 16 is a view similar to Figure 15 with the elements in a different operating position.

Figure 17 is a partial view similar to Figure 15 with the parts in a third position.

Figure 18 is an enlarged sectional detail taken approximately on the line 18—18 of Figure 19.

Figure 19 is a section taken approximately on the line 19—19 of Figure 11.

Figure 21 (Sheet 14) is a perspective of the guide plate.

Figure 22 (Sheet 12) is a sectional detail of a portion of the machine similar in general to Figure 14 with the parts in a different position.

Figure 25 is a diagrammatic front elevation of the machine illustrating the various treatment steps.

Figure 26 is a diagrammatic plan view illustrating the treatment steps.

Figure 27 (Sheet 13) is a detail illustration of the cooperation of the spring and presser foot during partially advanced position.

Figures 29 to 33, inclusive, are detail views of certain of the cams.

Figures 34 to 39, inclusive, are diagrammatic illustrations of certain of the operating cycles.

Figure 40:
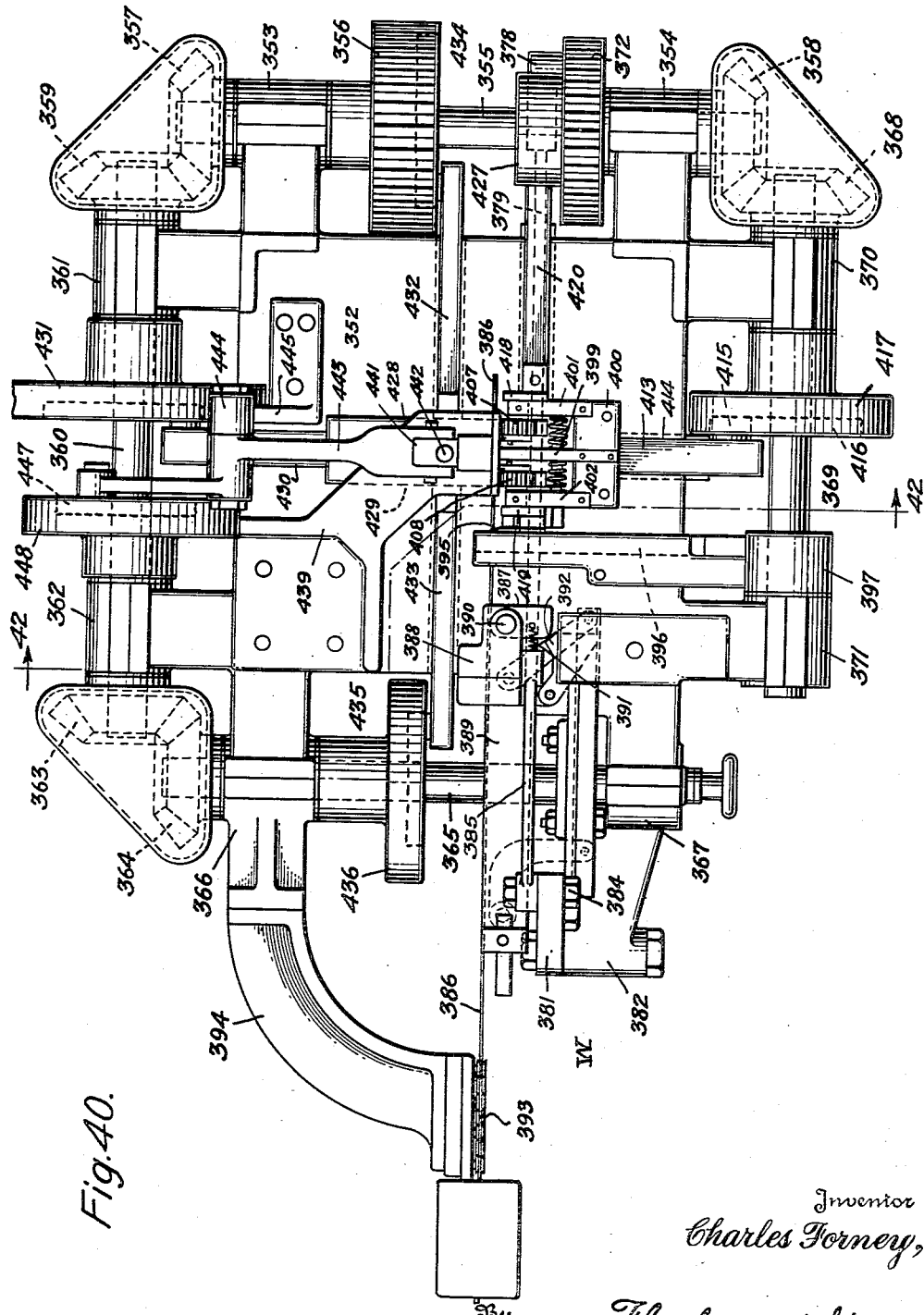

Figure 40 is a plan view of a portion of the machine incorporating the wire making apparatus.

Figure 41:
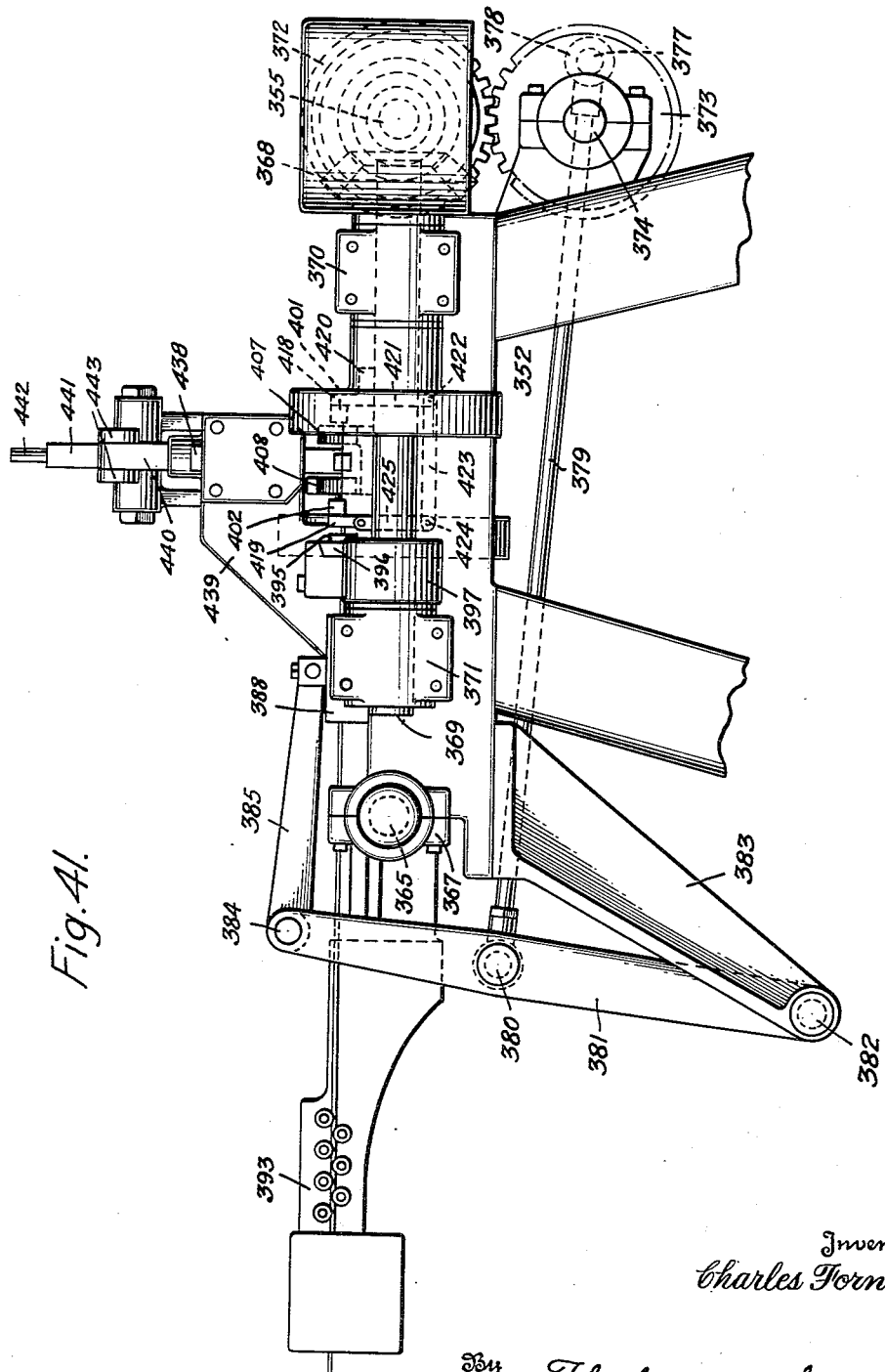

Figure 41 is a side elevation of the portion of the machine shown in Figure 40.

Figure 42:
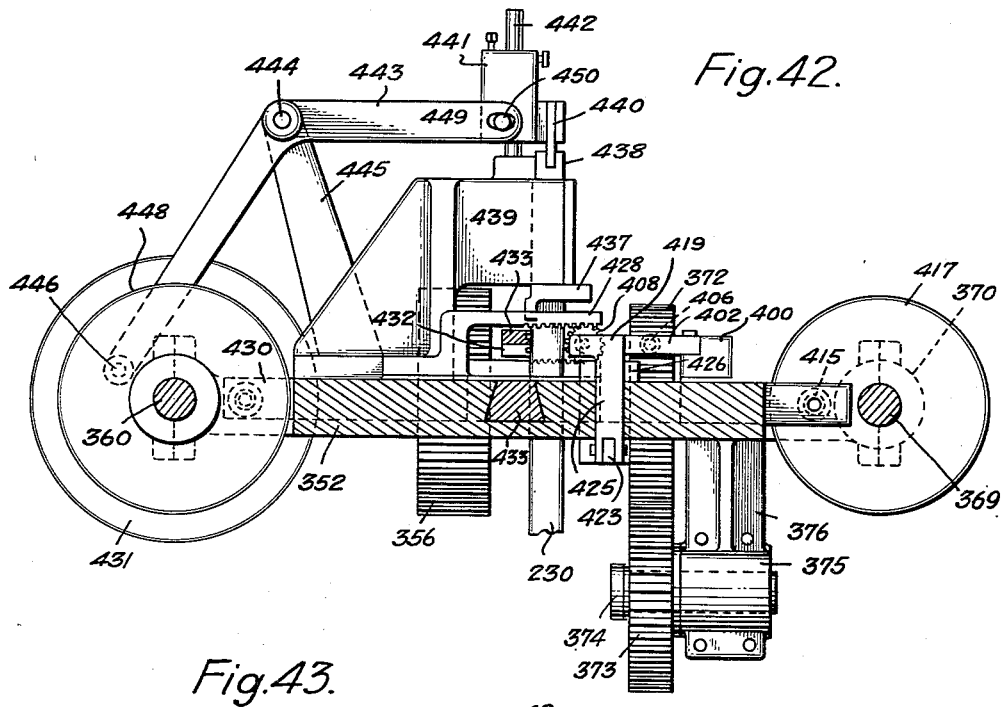

Figure 42 is a section taken generally along the line 42—42 of Figure 40.

Figure 43:
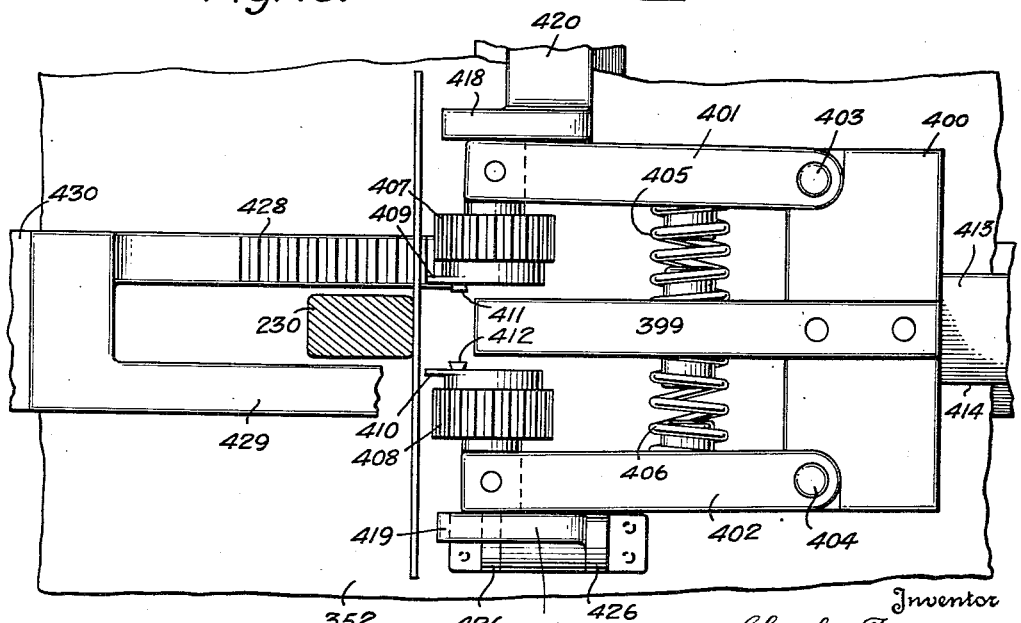

Figure 43 is an enlarged detail of a portion of the machine showing the wire in position prior to bending.

Figure 44 is a view similar to Figure 43 with the parts in position after the first bending step.

Figure 45 is a section taken on the line 45—45 of Figure 44.

Figure 46 is a view similar to Figure 45 illustrating the parts of the apparatus towards the end of the bending operation.

Figure 47:
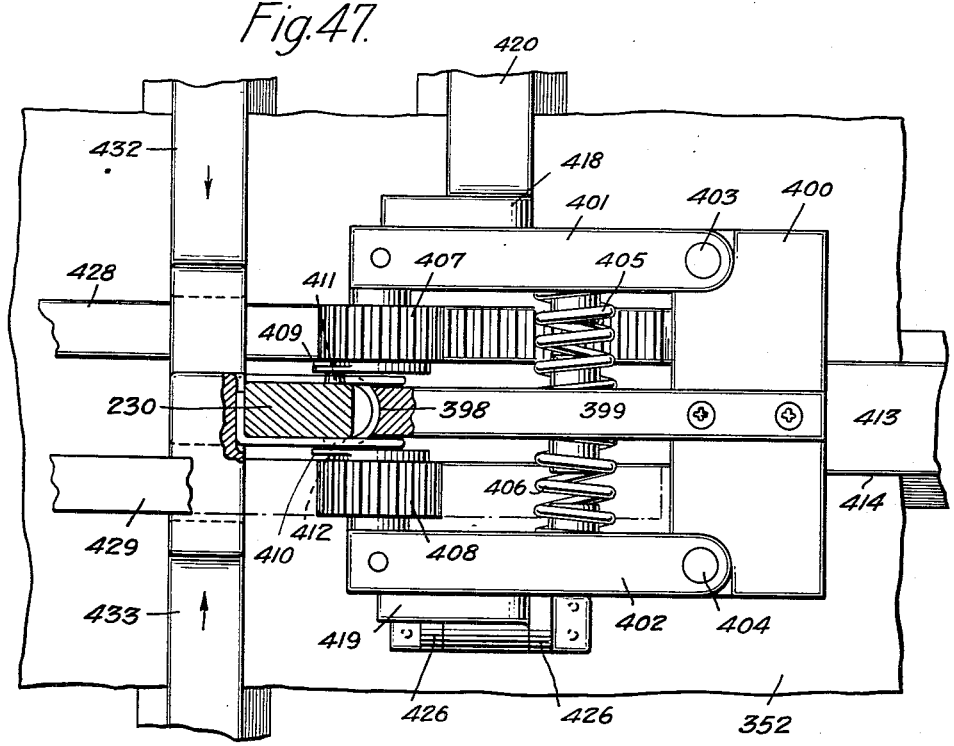

Figure 47 (Sheet 18) is a view similar to Figures 43 and 44 illustrating the position of the parts after the final bending operation.

Figure 48:
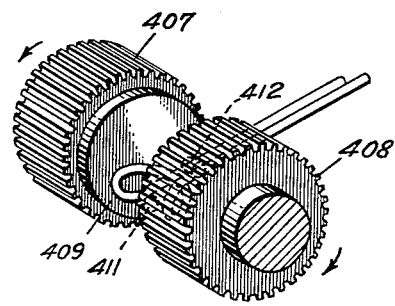

Figure 48 is a diagrammatic illustration showing the bending gears and wire at an intermediate stage of bending.

Figure 49:
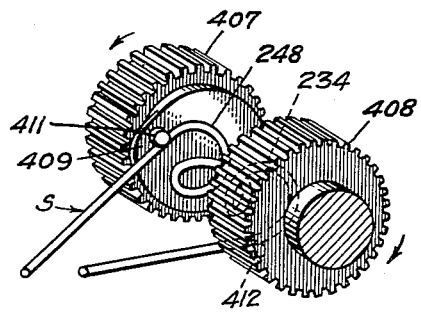

Figure 49 is a view similar to Figure 48 illustrating the position of the bending gears during a stage of bending equivalent to that shown in Figure 46.

Figure 1:
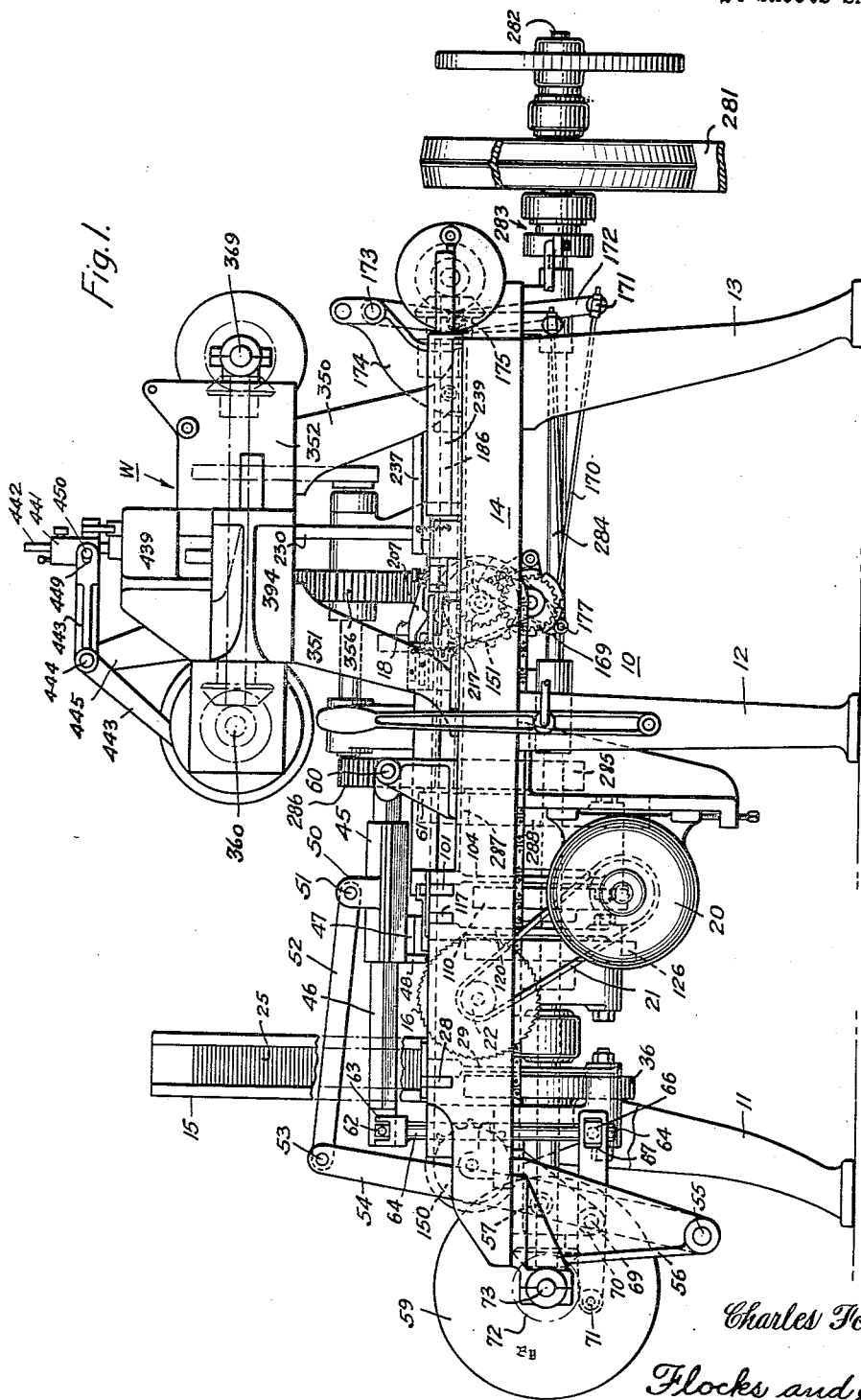
Figure 1 is a side elevation of the apparatus in accordance with the present invention.

Referring to the figures of the drawing and particularly Figure 1 thereof, the pin forming machine of the present invention is indicated in general at 10. The machine is supported by a plurality of legs 11, 12, and 13 which support a bed plate 14. Supported from the bed plate 14 is a magazine 15, a plurality of saws 16, the wire forming mechanism indicated in general at W and the wire and pin assembling mechanism indicated in general at 18. The machine also includes a plurality of transfer mechanisms for moving the blanks to the saws, moving the sawed pins to the wire and pin assembling mechanism and supplying spring wire at properly timed intervals to the pins, as will be hereinafter set forth in detail.

The pin sawing mechanism

Referring in particular to Figures 3 to 10, inclusive, the saws 16 are spaceably mounted for rotation upon a shaft 19 which is driven from the motor 20 as by the drive belt 21 which is trained over the pulley 22 on the shaft 19. The saws 16 are preferably six in number, each of the end saws which are indicated at 23 and 24 serving to trim the edges of the blank so that the blank 25 when supplied to the saws is transversely divided into five complete pins and in addition the saws 23 and 24 trim the edges thereof so that the pin assemblies are of uniform size irrespective of the precise dimensions of the blank 25.

Figure 7:
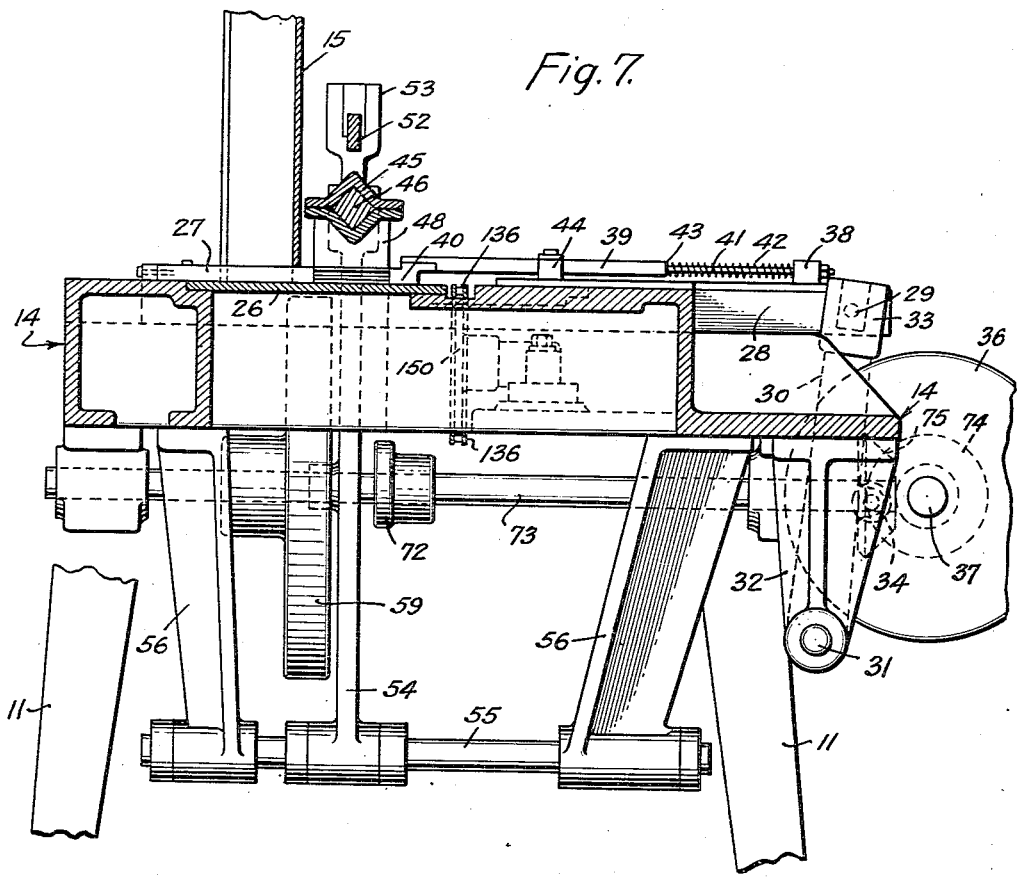
Figure 7 is a section similar to Figure 5 with parts in a different position.
Figure 23:
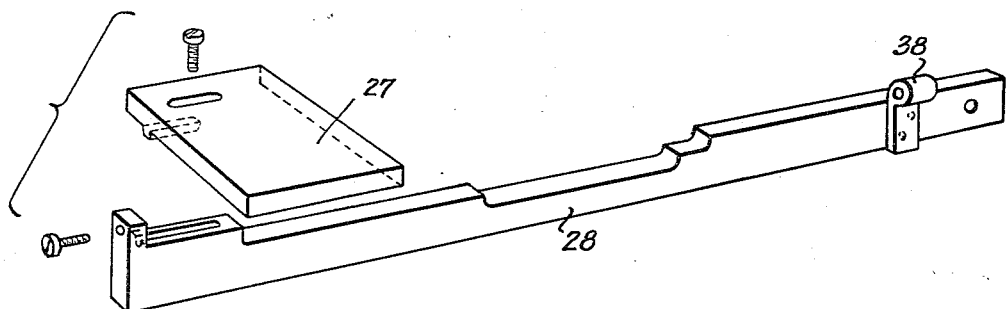
Figure 23 (Sheet 6) is a perspective detail of the slide mechanism.

As best shown in Figure 5, the blanks 25 are stacked manually or otherwise in the magazine 15, each of the blanks 25 being composed of two complementary portions of a width somewhat larger than sufficient for five complete pins and of an outer configuration equivalent to that of the finished pin. The lower end of the magazine 15 is cut away so that the bottom pin blank rests upon a saw table 26. During the operation of the machine the lowermost pin blank assembly is moved from the position shown in Figure 5 by a transfer mechanism including a pin blank contacting portion 27 carried upon a slide 28 which is provided with an operating pin 29 at its right-hand end, as best shown in Figures 5 and 7. The pin 29 is reciprocated by a lever 30 which is pivoted at 31 to a hanger 32 carried by the bed plate 14. The upper end of the lever 30 is provided with a yoke 33 cooperating with the pin 29 and intermediate the yoke and pivot point the lever 30 carries a roller 34 which cooperates with a cam slot 35 in a rotatable cam 36 mounted on the rear drive shaft 37. The slide 28 also carries on its upper surface a projection 38 which supports one end of a rod 39 of a pin blank contacting portion 40 at the end thereof remote from the projection 38. A portion of the rod 39 is reduced in section and indicated at 41 and mounted about this reduced portion 41 is a spring 42, the spring 42 bearing at the right-hand end against the projection 38 and at its left-hand end against the shoulder 43 terminating in the reduced portion 41. The rod 39 is therefore urged to the left as shown in Figures 5 and 7 against the blank 25 while reciprocating with the arm 28, being guided in this reciprocating movement within the guide 44.

The function of the arm 28 and parts assembled therewith is to move a single blank from the magazine 15 from the position shown in Figure 5 transversely of the machine into the position shown in Figure 7. When the blank 25 is moved into the position shown in Figure 7, as best shown in Figure 3, it is then in position to be moved through the saws 16.

Referring now to Figure 4, the blank 25 is shown in the position which it occupies prior to the sawing operation. At this time the blank is in alignment with the slide 45 which is carried by the rail 46 for sliding movement longitudinally of the machine. The slide 45 is provided at its lower portion with a downwardly depending presser plate 47 which is spaced from the saw table 26 a distance corresponding to the thickness of the blanks 25 so as to retain these blanks firmly against the table 26 during their movement through the saws 16.

At the rear end of the press plate 47 there is mounted a push plate 48 which extends below the level of the press plate 47 for moving the blanks 25 through the saw. As best shown in Figure 8, the push plate 48 as well as the press plate 47, is provided with a plurality of notches 49 in alignment with the saws 16 so that the blanks may be moved through the saws by the push plate without interference therewith.

The upper end of the slide 45 is provided with an ear 50 which carries a pin 51 pivotally connecting the ear 50 to a link 52. The link 52 is in turn pivotally connected at 53 to a lever 54 which is pivoted at 55 to a hanger 56 depending from the bed plate 14. The lever 54 carries a roller 57 which cooperates with a slot 58 in the cam 59. The slide 45 is thereby moved by link 52 to reciprocate between the positions shown in Figures 1 and 4. The guide rail 46 is pivoted at 60 to a standard 61 supported on the bed plate 14. The end of the guide rail 46 remote from the pivot 60 is provided with a projecting block 62 supported by the yoke 63 on the rod 64 which is vertically slidable in a suitable bearing 65 supported by the bed plate 14. The lower end of the rod 64 is provided with a pin 66 which projects into a socket 67 on the lever 68. The lever 68 is pivoted at 69 to a hanger 70. The end of the lever 68 carries at the end remote from the socket 67 a roller 71 which cooperates with a cam 72. Movement of the lever 68 by the cam 72 will consequently move the rod 64 upwardly and downwardly and similarly move the guide rail 46 upward and downward about the pivot 60. This enables the sawn blank to be released from the presser plate 47 after the sawing operation is completed, i. e. when the slide 45 is moved just beyond the position shown in Figure 1.

The presser plate 47 after releasing the blank moves rearwardly in an elevated position until it reaches the position of Figure 4 and until after an additional blank is inserted beneath the presser plate. Thereafter the guide rail 46 moves downwardly about the pivot 60 and it causes the presser plate 47 to hold the new blank firmly against the table.

The cams 59 and 72 are rotatable with the left-hand lateral drive shaft 73 which is driven from the rear drive shaft 37 by means of the bevel gears 74 and 75.

*The pin assembly transfer mechanism*

As the guide rail 46 is being moved upwardly to relieve the pressure of the presser plate 47 upon the sawn pin blank, the pin assemblies are moved into position to be contacted by the pin blank contacting portion 100 on the slide 101 which reciprocates transversely of the bed plate 14, as best shown in Figure 3. The slide 101 is provided at the end remote from the pin contacting portion 100 with a pin 102 which is received within the fork 103 of the lever 104 which is pivotally supported as by pivot 105 on a hanger 106 which in turn is supported by the bed plate 14 (see Figure 8). The intermediate portion of the lever 104 is provided with an extension 107 which carries a roller 108 cooperating with a cam slot 109 in the cam 110, driven by the shaft 37. The intermediate portion of the slide 101 is provided with a cam plate 111 having a cam slot 112 therein which receives a pin 113 carried by a lever 114. The rearward end of the lever 114 is pivoted at 115 on an ear 116 carried by a slide 117 which is journalled in the bed plate 14 for sliding movement transversely of the bed plate. The slide 117 is provided with a pin 118 cooperating with the forked end 119 of a lever 120 which is pivoted at 121 in a hanger 122 supported by the bed plate 14.

Intermediate the pivot and fork the lever 120 is provided with a projection 123 which carries a roller 124 which cooperates with a cam slot 125 in the cam 126 which is rotatable with the shaft 37. This linkage serves to reciprocate the slide 117 between the positions shown in Figures 8, 9, and 10, respectively. At the same time during the reciprocating movement of the slide 117 and the ear 116 which similarly moves the lever 114, the lever 114 is pivotally raised and lowered about the shaft 115 by the cooperative action of the pin 113 within the cam slot 112. The end of the lever 114 remote from the shaft 115 is provided with a downwardly depending finger 127 which is adapted to contact and move pin assemblies for a purpose to be hereinafter described. The finger 127 is carried by a rod 128 which is mounted in the bearings 129 and 130 carried by the lever 114. The rod 128 carries a pin 131 which engages one end of a spring 132 wound about the rod 128. The spring therefore normally moves the finger 127 to the left, as shown in Figures 8, 9, and 10 and correspondingly exerts pressure against the pin assemblies.

As shown in Figure 9, the sawn pin blank which, as sawn, consists of five pin assemblies has just been moved from under the presser plate 47 to its extreme rearward position where it is stopped by a stop 133. At this time the sawn pin blank is held in position on the table 26 by a spring arm 134. The first of the pin assemblies which is indicated at 135 is now positioned over a moving chain 136 which removes the pin assembly 135 from the remaining pin assemblies. The pin blank contact member 100 now moves forwardly into the position of Figure 10 and at that time the finger 127 drops down into the position of Figure 10 and presses the pin assemblies against the stop 133 so that as each pin assembly is moved away from the other pin assemblies, a succeeding pin assembly is fed on the chain 136. In the position of Figure 8, all of the pin assemblies have been moved by the chain with the exception of a single pin assembly 137. As the pin assembly 137 is removed by the chain, the operation is repeated to bring five more pins into position for chain movement.

The pin feed and assembly

Figure 2:
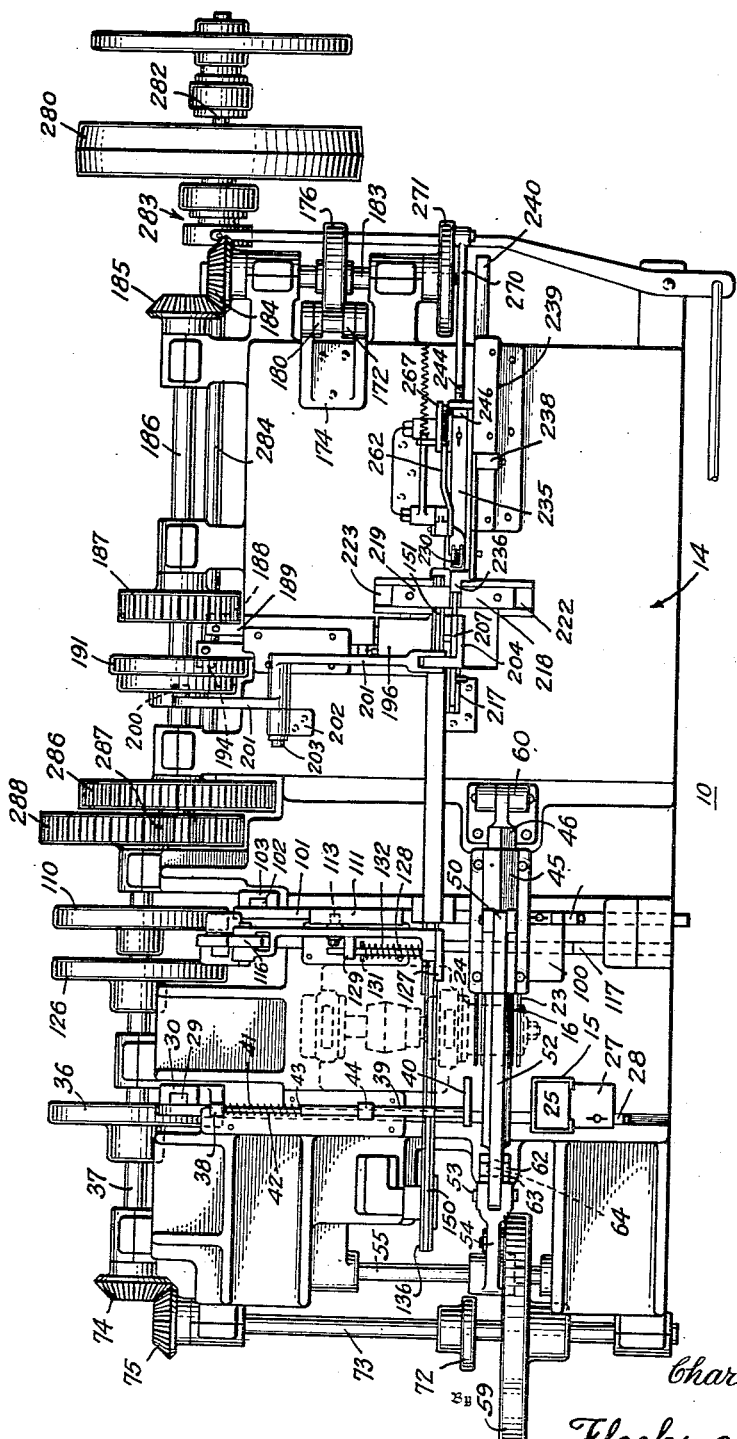
Figure 2 is a plan view.
Figure 13:
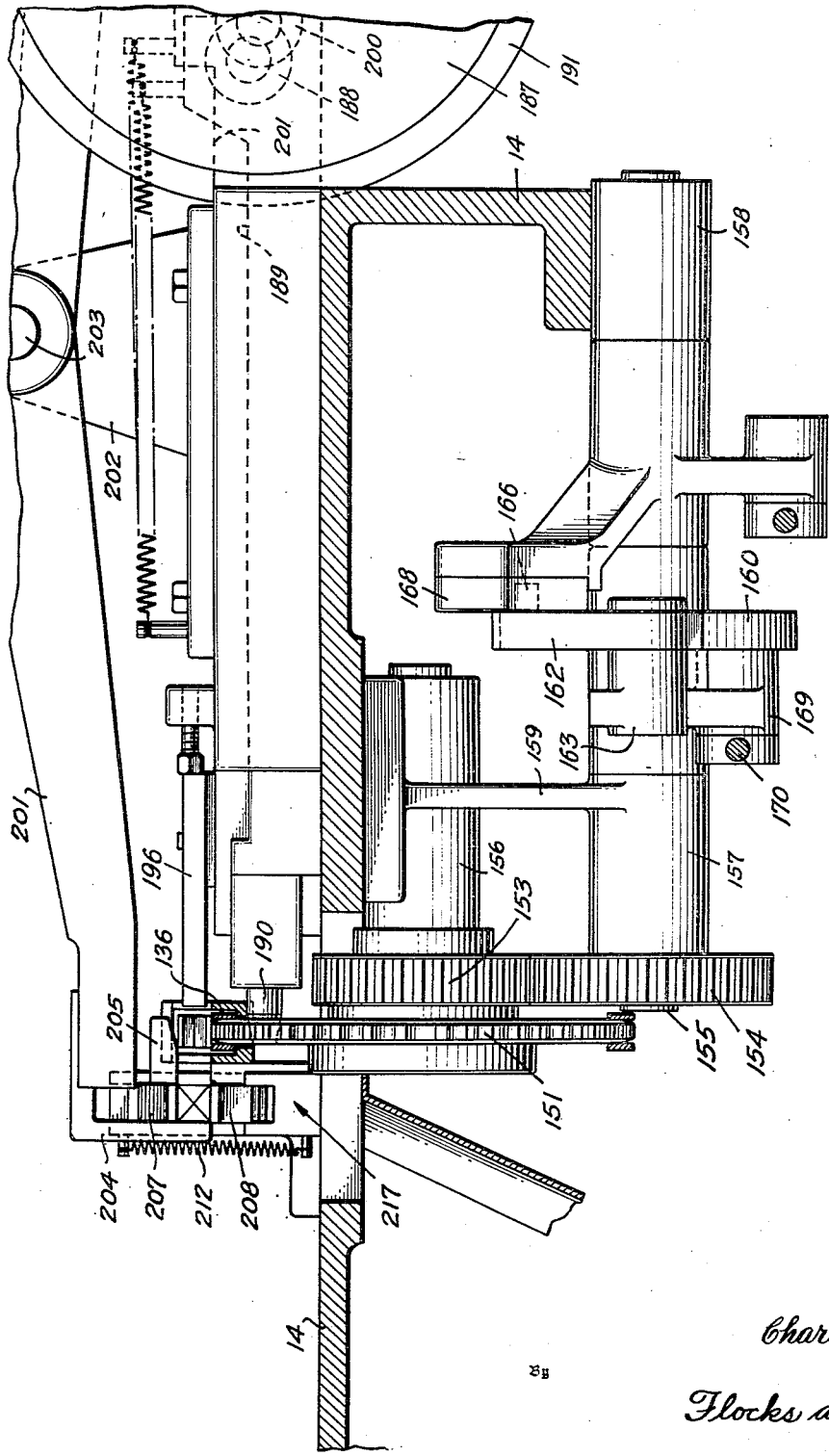
Figure 13 is a section taken approximately on the line 13—13 of Figure 12.

Referring to Figures 1 and 2, it will be noted that the chain 136 is trained at one end over a sprocket 150 and at the other end over a sprocket 151. The sprocket 151 is best shown in Figure 15 and as there shown is carried by a shaft 152. The shaft 152 carries a gear 153 which meshes with gear 154 mounted for rotation with the shaft 155. The shaft 152 is supported by the bearing 156 and the shaft 155, as best shown in Figures 13 and 15, is supported by the bearings 157 and 158 carried by the hanger 159 and the bed plate 14, respectively. The shaft 155 also carries a ratchet 160 provided with ratchet teeth 161. A pawl 162 is provided pivoted at 163 to the bell crank lever 164 which is pivoted on the shaft 155. The pawl 162 is provided with a nose 165 which fits between the teeth 161. The pawl 162 also carries a pin 166 which fits within a cam slot 167 in a cam lever 168. The cam lever 168 is also pivoted on the shaft 155. The end of the bell crank lever 164 remote from the pivot 163 is pivoted at 169 to a rod 170 which is connected at its other end as at 171 to a lever 172 pivoted at 173 to a standard 174. The intermediate portion lever 172 is provided with a roller 175 operating in a suitable cam slot in the cam 176. The cam lever 168 is similarly pivotally connected as at 177 to one end of a rod 178 which is connected at its other end as at 179 to a lever 180 which is also pivotally supported by the standard 174 at 181. The lever 180 also carries a roller 182 which cooperates with a second suitable cam slot in the cam 176. The cam 176 is mounted for rotation with the right-hand lateral drive shaft 183. The shaft 183 is driven by means of the bevel gears 184 and 185 from the shaft 186. The shaft 186 is provided with a cam gear 187 which serves to drive a wire bending mechanism illustrated in general at W. In addition, the gear 187 is provided with a cam slot on its face which cooperates with a pin 188 on a slide 189. The end of the slide 189 carries a pin 190 which fits into a suitable opening in the sprocket wheel 156 so that as the chain has carried a pin assembly into proper position the chain is stopped in this position until the pin 190 is withdrawn, as shown in Figure 22. The shaft 186 also carries a cam 191 for rotation therewith provided with a pair of cam slots 192 and 193 on each face thereof. The slot 192 cooperates with the pin 194 carried on a slide 195 which carries on its end remote from the pin 194 a pin contacting transfer plate 196. The transfer plate is connected to the slide in a manner similar to the transfer plate 27 so that it will be capable of adjustment.

The cam slot 193 cooperates wtih a pin 200 which is carried on a rocker arm 201 pivoted to the standard 202 at 203. The rocker arm 201 carries at its end remote from the pin 200 a depending finger 204 which functions as a stop for the pin assembly when it is moved from the chain into assembly position, as shown in Figure 13.

As best shown in Figure 12, when the plate 196 moves the pin assembly it is guided by the cam fingers 206 and 205 into position between the jaws 207 and 208 at its rearward end and beneath the jaw clamp 209 (Fig. 15) at its forward end; the lower forward end of the pin being supported on the fixed ledge 210. The jaw 208 is urged upwardly by the spring 211 and the jaw 207 is urged downwardly by the spring 212. Similarly the clamp 209 is urged downwardly by the spring 213 which pushes upwardly on the rearward end of the clamp 209 beyond the pivot 214.

It is to be noted that the clamp members 207 and 208 are pivoted at 215 and 216, respectively, within the supporting member indicated in general at 217. As the pin assembly is moved into the position just described, it is also moved between the spring spreader members 218 and 219. As best shown in Figures 18 and 19, the spring spreader members 218 and 219 are pivoted at 220 and 221, respectively, to supporting blocks 222 and 223, respectively. The spreaders 218 and 219 are also urged towards each other by the springs 224 and 225.

Figure 20:
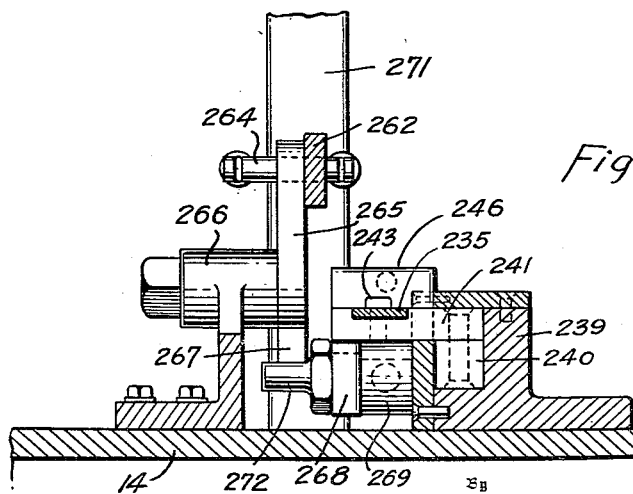
Figure 20 is a section taken approximately on the line 20—20 of Figure 19.

Referring once again to Figure 15, the pin assembly is shown in position and a single spring indicated in general at S has just been fed to the machine down the post 230. At the lower end of the post the spring is positioned upon a guide plate 231 provided with grooves 232 and 233 (Figure 21). As shown in Figure 15, one of the coils 234 is within the long groove 232. A push rod 235 is reciprocated to move the spring along the guide plate 231 and under the presser foot 236. The presser foot 236 is carried by the arm 237 which is pivoted at 238 to the guide casting 239 (Figs. 15 and 20). Mounted within the guide casting 239 for slidable movement is a slide 240 which in turn carries a block 241 which has adjustably affixed thereto the rod 235. As best shown in Figure 12, the rod 235 is provided with a slot 242 therein and a lock screw 243 projects into the slot from the block 241 (Figure 19). Adjustment of the rod 235 is effected by moving the adjustment bolt 244 threaded within the ear 245 which is carried by the block 241, the bolt 244 bearing against an ear 246 on the rod 235. The presser foot 236 is urged downwardly by a spring 247 so that as the push rod 235 moves the spring S towards the spreaders 218 and 219, the spring is held against the guide plate 231, as best shown in Figure 15. During this movement one coil 234 of the spring is initially engaged within the long groove 232 and as the spring is is moved under the presser foot 236 the other coil 248 is moved into the shorter groove 243.

Figure 28:
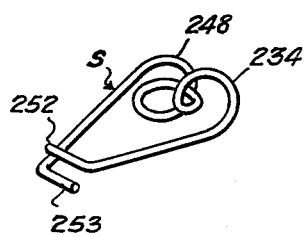
Figure 28 is a detail view of the spring prior to assembly with the pin.

As soon as the spring which, as best shown in Figure 28, extends downwardly to a greater extent at the coil 234 than at the other coil 248, enters the short groove 233, proper alignment is insured as it is moved under the presser foot. Further movement of the spring into the position shown in Figure 16 initiates the expansion of the spring as the convolutions of the spring are forced up the inclined faces 250 and 251 (Figure 16). As the end of the rod approaches the spreaders 218 and 219, the spreaders are moved apart and further movement of the spring by the push rod will snap the tails 252 and 253 of the springs into position in the grooves 254 and 255 of the pin (Figure 17). It will be noted that the spring spreaders 218 and 219 are provided with rearwardly extending tails 256 and 257 which overhang the ends of the pin and insure the passage of the tails 252 and 253 of the spring onto the pin.

It will be noted that the present device is also provided with an additional presser foot 258 which is carried by an arm 259 which is pivoted at 260. The arm 259 is pivotally connected at 261 to a link 262 which is connected by the slot 263 and pin 264 to the lever 265. The lever 265 is pivotally supported at 266 and is provided with a tail 267.

The rod 235, as previously described, is adjustably carried by the block 241 which in turn is riveted to the slide 240. The block 241 is provided with a downwardly depending lug or ears 268 which receives a pivot pin 269 pivotally connected to the rod 270 which is reciprocated by the eccentric 271. The pivot pin 269 is provided with a projection 272 which, as shown in Figure 15, supports the tail 267 and the lever 265 and at this time forces the presser foot 258 against the spring S. When the rod 235 is in a forward position, as shown in Figure 16, the pin 269 has moved beyond the tail 267 and allowed the tail to drop so that the presser foot is lifted upwardly allowing a spring S' to drop in the position to be fed. The spring 273 serves to actuate the presser foot and accompanying lever structure.

The drive mechanism

Referring to Figures 3 and 12, the main drive pulley for the machine is indicated at 280. This is suitably driven as by a belt 281 from a motor (not shown).

The drive pulley 280 rotates a shaft 282 which drives a clutch indicated in general at 283 which in turn drives a lower drive shaft 284. The drive shaft 284 rotates a pinion 285 (Figure 1) which drives a gear 286 rotatable with the drive shaft 186, previously described.

Figure 24:
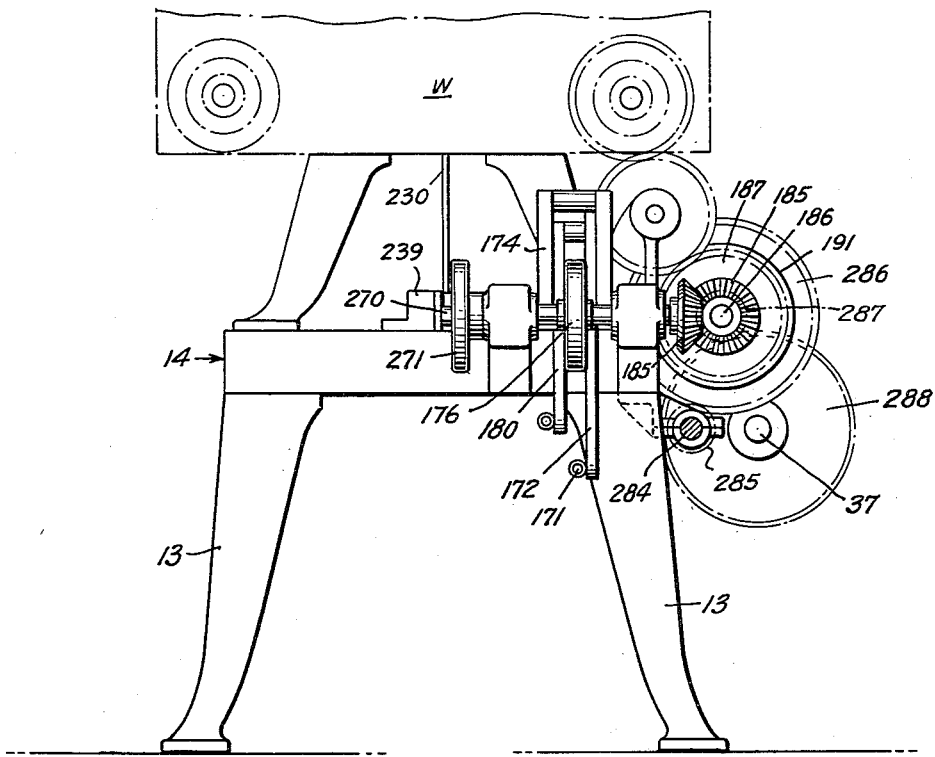
Figure 24 (Sheet 16) is an end elevation of the machine showing a portion of the drive.

A second pinion 287 rotatable with the gear 286 drives the gear 288 which in turn drives the shaft 37, previously described. On the shaft 186 there is provided a cam gear 187, previously described, which serves to drive the wire forming mechanism so that the wire forming mechanism provides the springs S in times relation and proper coordination with the pin assembly supplying means (see also Figure 24).

The shaft 37 drives the shaft 73 through the bevel gears 74 and 75. Similarly the shaft 186 drives the shaft 183 through the bevel gears 185 and 184.

The shaft 73 drives the cam 59 which serves to operate the slide 45 for moving the blanks longitudinally of the table 14 and through the saws. The cam 72 serves to lift and lower rail 46 through the rod 64 so as to lift and lower the push plate 48. The shaft 37 drives the cams 36, 126 and 110, the cam 36 serving to operate the transfer mechanism including the pin blank contacting portions 27 and 40. This serves to move the blanks from the magazine 15 into the path of the pusher member for movement through the saw. The cams 126 and 110, as previously described, operate the transfer mechanism for moving the sawn blanks transversely of the table 14 and feeds these blanks to the conveyor 136. The conveyor 136 moves the pin assemblies in separated relation to the assembling mechanism to the assembling point where they are assembled with the springs as just previously described.

The wire bending mechanism

The wire bending mechanism W is supported upon the bed plate 14 by a plurality of legs of which two are shown in Figure 1 and indicated at 350 and 351. The legs serve to support a bed plate 352 which in turn carries a plurality of bearings of which the bearings 353 and 354 serve to support for rotation a main drive shaft 355 which carries a drive gear 356 which meshes with and is driven by the gear 187 on the drive shaft 186 so that the wire bending mechanism is driven in synchronism with the remainder of the machine. The main drive shaft for the wire bending mechanism 355 is provided at each end with a bevel gear, these gears being indicated by the reference numerals 357 and 358. The bevel gear 357 meshes with and drives a bevel gear 359 supported by and rotatable with a shaft 360 which is supported by the bearings 361 and 362 from the bed plate 352. The shaft 360 carries at its end remote from the bevel gear 359 a second bevel gear 363 which meshes with and drives a bevel gear 364 which in turn drives the shaft 365 supported from the bed plate 352 by bearings 366 and 367. The second bevel gear 358 upon the main drive shaft 355 meshes with and drives a bevel gear 368 which in turn rotates a shaft 369 supported by the bearings 370 and 371 from the bed plate 352.

The main drive shaft 355 is provided with a feeder drive gear 372 which is rotatable with the drive shaft. The feeder drive gear 372 meshes with and drives a gear 373 carried upon a stub shaft 374 which is rotatable in and supported by the bearing 375 suported by the hanger 376 from the bed plate 352. Extending from the face of the gear 373 is a pivot pin 377 having journalled thereabout a collar 378 attached to the rod 379 so that upon movement of the gear 373 the rod is given a reciprocating movement. The rod 379 is pivoted as by the pivot 380 to the lever 381 which is pivotally supported at 392 from the arm 383, in turn suported by the bed plate 352. The end of the lever 381 remote from the pivot 382 is pivotally connected at 384 to the rod 385. The rod 385 serves to move a friction feeding device for feeding the wire 386. The friction feeding mechanism includes a wire gripping dog 387 which, aided by the jaw 388, serves to grip the wire upon forward movement along the guideway 389. The dog 387 is pivoted on the pivot 390 and is urged by the spring 391 out of gripping position and during rearward movement of the friction feeding mechanism, the dog is permitted to pivot clockwise about the pivot 390 to release the wire. Upon forward movement, however, the dog 387 is urged into wire gripping position by the action of the nose 392.

During the feeding movement the wire is kept under tension and straightened by the wire straightening rolls indicated at 393. These rolls are suitably supported by the arm 394. After a suitable length of wire is fed at each forward movement, the wire is cut by a sliding knife 395 mounted upon a block 396 and driven from a cutoff cam 397 which is mounted for rotation with the shaft 369. The forward portion of the wire 386 just prior to being cut off is positioned in the slot 398 formed in the bar 399 carried by the cross-head 400. The cross-head 400 also supports a pair of arms 401 and 402 pivoted to the cross-head on the pivots 403 and 404, respectively, and urged outwardly by the springs 405 and 406. The ends of the arms 401 and 402 each pivotally support the gears 407 and 408, respectively, these gears being provided with cam faces 409 and 410 and with bending pins 411 and 412.

The cross-head 400 is mounted on the slide 413 which is slidably mounted within a groove 414 in the bed plate 352. The slide 413 is provided with a pin 415 which cooperates with a groove 416 in the cam 417 mounted for rotation with the shaft 369. Gears 407 and 408, as previously described, are urged outwardly by the springs 405 and 406. This outward and inward movement of the gears 407 and 408 is necessary in order to permit the release of the wire in final bent form, as will be hereinafter set forth. An additional movement, however, of the slide 413 toward the wire will move the gears and the cam faces 409 and 410 and bend the wire into the position shown in Figure 44 at which time the gears will also move inwardly against the force of the springs 405 and 406. This movement is effected by the push members 418 and 419. The member 418 is mounted upon a slide 420 which is slidably mounted in a guide groove within the surface of the bed plate 352. The push member 418 is provided with a downwardly extending tail 421 which is pivotally connected at 422 to a link 423 in turn pivotally connected at 424 to the tail 425 of the push member 419. The push member 419 is pivotally mounted at 426 between ears which extend upwardly from the bed plate 352. Movement of the slide 420 to the left, as shown, for example, in Figure 41, will correspondingly move the push member 418 to the left and the push member 419 to the right thus moving the gears 407 and 408 inwardly.

Forward movement of the slide 413 will carry the pins 411 and 412 into engagement with the wire in the position shown in Figures 44 and 45. The slide 420 is moved by a cam 427 which is mounted to rotate with the gear 372. The lower portion of the gear 407 meshes with the rack 428 and the top of the gear 408 meshes with the rack 429. The racks 428 and 429 are carried by the slide 430 which is mounted for sliding movement within a groove in the bed plate 352 and is driven by the cam 431 mounted to rotate with the shaft 360. Movement of the slide 430 to the right as shown in Figure 43 will rotate the gear 407 counterclockwise and the gear 408 clockwise, correspondingly moving the pins 411 and 412. Thus the continued rotation of the pins will bend the wire so that it is provided with a pair of spiral portions or coils 234 and 248, best shown in Figure 28 and previously described. Successive steps in the spiral-forming operation are illustrated by Figures 43 and 44 and the diagrammatic views 48 and 49.

After the spiral is formed, as shown in Figure 49, a pair of tails 252 and 253 are formed at the free ends of the wire by the slides 432 and 433. The slide 432 is moved inwardly to perform the bending operation by the cam groove 434 formed within the drive gear 356 and the slide 433 is moved by the cam groove 435 within the cam 436 which is mounted to rotate with the shaft 365. After the spring is formed, as shown in Figure 47, about post 230, the gears 407 and 408 are released by the pusher members 418 and 419 and are permitted to move outwardly under the influence of springs 405 and 406. Thereafter the retracting movement of the cross-head 400 moves the groove 398 away from the finished spring so that the spring is now free to slide down the post for assembly with the remainder of the clothes pin. This feeding movement of the spring is insured by the action of the stripper nose 437 which is moved downwardly at this time by the slide 438 journalled in the standard 439. The slide 438 is moved by the link 440, carried by the head 441 which is slidably movable upon the rod 442. The head 441 is moved by the bell-crank lever 443 which is pivotally mounted at 444 upon the standard 445 and is provided with a pin 446 which moves in a cam groove 447 within the cam 448 which is rotatable with the shaft 360. The bell-crank lever 443 is connected to the head 441 as by the slot 449 and pin 450.

Operation

Referring now to Figures 25 and 26, the path of the blanks and the assembly thereof with the pins is diagrammatically shown. The magazine 15 is indicated at station A. As shown by the arrow 300, the blanks are moved transversely of the table 14 to the station indicated at B in alignment with the saws 16. As indicated by the arrow 301, from station B the blanks are moved through the saw in parallel with the longitudinal axis of the table 14 to saws 16 and the blanks are moved as indicated by the arrow 302 to a position adjacent the conveyor indicated at D. The conveyor 136 carries the blanks in end-to-end separated relation longitudinally of the table 14 as indicated by the arrow 303 to station E where they are then moved transversely of the table as indicated by the arrow 304 to station F where they are clamped in position while the springs S are fed thereon from station G, these springs being supplied in timed relation by the wire making machine W, as previously described. From the station F, the assembled clothes pins are discharged, as indicated by the arrow 305.

Figure 34:
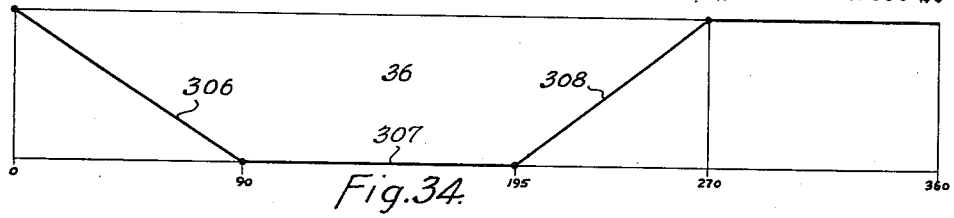

Referring now to Figures 34 to 39, inclusive, the action of the first transfer mechanism 36 is indicated in Figure 34 with relation to a 350 degree revolution of the drive shaft 37 or any of the other shafts driven from the main drive shaft 282. The portion of the diagram indicated at 306 illustrates forward movement of the blank from the magazine, i. e. from the station A to station B in Figure 26. During the portion of the diagram indicated at 307, the first transfer mechanism is stationary so that the blanks may be moved from station B through the saws 16 and the portion of the diagram indicated at 308 illustrates the return movement of the transfer mechanism, all of these movements being effected by the cam 36.

Figure 35:
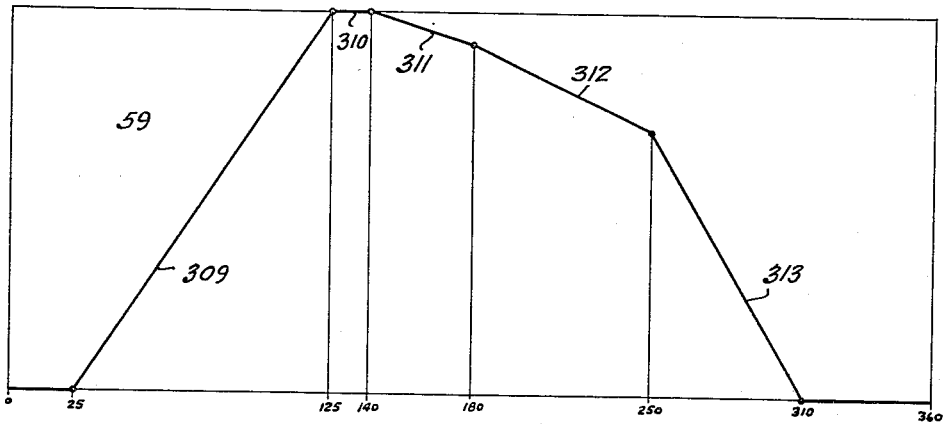

Referring to Figure 35, this figure illustrates the movement produced by the cam 59 upon the push plate 48. As shown at 25, the portion of the diagram indicated at 309 illustrates the return of the push member to pick up a blank. The portion of the diagram indicated at 310 is a rest period prior to movement of the push member towards and through the saws as indicated by the portions of the diagram 311, 312, and 313.

Figure 36:
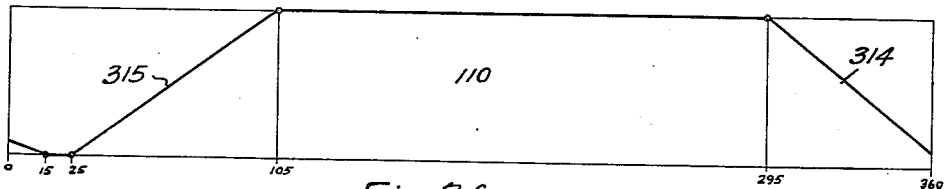

Figure 36 illustrates the movement produced by the cam, effective to move the sawn blanks from station C to station D. The feed movement is indicated at 314 and the return movement at 315. This diagram in particular refers to the movement of the first feed member, i. e. the slide 101 and the pin blank contacting portion 100.

Figure 37:
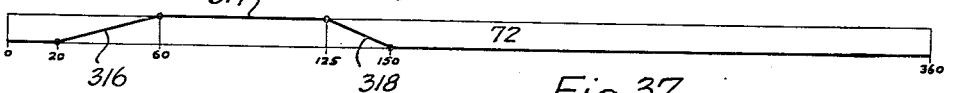

Figure 37 illustrates the lifting and lowering of the saw feed slide, i. e. the movement of the guide rail 46. As shown, the guide rail is lifted during the portion of the diagram indicated by the reference character 316, and is retained in lifted position during the portion of the diagram indicated at 317, and finally lowered as indicated by the portion of the diagram 318.

Figure 38:
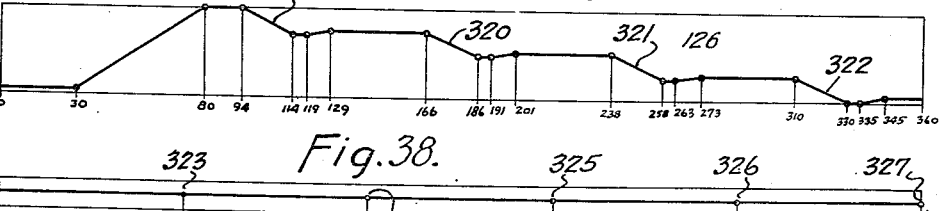

Figure 38 illustrates the movement of the feed mechanism which is effective to intermittently feed the sawn blanks to the conveyor, i. e. the finger 127. As shown this action is produced by the cam 126 and includes a plurality of feeding movements, indicated at 319, 320, 321, and 322. It will be noted that there are four of these feeding movements, the first pin being fed directly to the conveyor by the movement of the pin blank contacting portion 100 which has just been referred to in connection with Figure 36.

Figure 39:
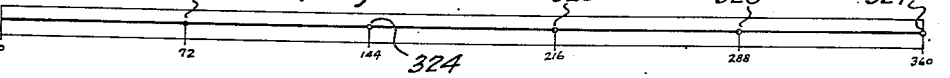

Figure 39 illustrates the movements of the conveyor chain 136 which is just stopped at the points 323, 324, 325, 326, and 327 in order to permit feed of the pins thereto. It is to be understood that the chain does not partake of another movement until after the pins have been fed to the chain.

It will be obvious to those skilled in the art that various changes may be made without departing from the spirit of the invention and therefore the invention is not limited to what is shown in the drawings and described in the specification but only as indicated in the appended claims.

I claim:

1. In a clothes pin machine, a magazine for card blanks wherein the card blanks are stacked one pair above another with each pair comprising two blanks in face-to-face relation, a gang saw, a wire assembly station, a conveyor for feeding sub-assemblies to said wire assembly station, means for transferring the lowermost pair of card blanks from said magazine to a first position, means for moving said pair of card blanks from said first position through said gang saw to a second position, means for moving a plurality of sawn sub-assemblies from said second position as a unit to a third position, means for transferring individual sub-assemblies from the third position to said conveyor which carries individual sub-assemblies to said wire assembly station.

2. A machine for forming clothes pins or the like from blank cards, comprising means for feeding pairs of blank cards, gang saws for sawing pairs of cards into a plurality of pin sub-assemblies, a take-away conveyor for separating said sawn sub-assemblies and means for transferring same to said conveyor, means for operating said feeding means and said sawing means at substantially the same effective speed, means for operating said conveyor at a relatively high speed whereby said sub-assemblies are taken away separately at a corresponding speed.

3. A machine for forming clothes pins or the like comprising a magazine for retaining in stacked relation pairs of blank cards, intermittent transfer means for moving the lowermost pair of blank cards out of stacked relation, means for stopping said transferring motion and aligning the edges of said pair of cards, a gang saw for sawing said blank pair of cards into pin sub-assemblies, and a second intermittent transfer means for moving said pair of cards through said gang saw including a holder for holding the meeting faces of said pair of cards in contact with each other.

4. In a machine for forming a clothes pin or the like, saw means for sawing a blank assembly into pin sub-assemblies, a pivoted guide rail positioned above said saw means, blank transfer means slidably supported by said guide rail in firm contact with said blanks during movement thereof through said saw means, means to rotate said guide rail about said pivot to release said transfer means for contact with said blank upon termination of the sawing operation, means to move said transfer means rearwardly along said guide rail while the same is in elevated position, and means to rotate said guide rail downwardly at the end of the rearward movement of said transfer means.

5. In a machine for forming clothes pins or the like, a saw table, saw means extending upwardly through said table for sawing a blank assembly into pin sub-assemblies, a guide rail pivotally supported at one of its ends adjacent said saw means and having its other end supported by a cam operated means so that said guide rail is generally in parallelism with said saw table, push means supported by said guide rail and having a downwardly projecting portion adapted to contact said blank and move the same through said saw means and a second portion bearing upon the upper surface of said blanks to retain the same in firm contact with the table during movement through said saw, means to move said push means so as to move said blanks through said saw, means to move said cam means to rotate said guide rail and lift said transfer means to release said blanks at the end of said sawing operation, means to move said push means rearwardly along said guide rail while the same is in raised position and means including said cam means to rotate said guide rail downwardly when the push means reaches its rearward position.

6. In a machine for forming clothes pins or the like, blank feeding means, blank sawing means for sawing said blanks into a plurality of clothes pin sub-assemblies intermittently at a relatively slow speed, blank push means for receiving said blanks from said feeding means and moving said blanks through said saw means, guide means for supporting said push means in firm contact with said blank assembly to exert pressure on said blanks during movement thereof through said saw means, means for lifting said guide means and means to transfer said sawn blanks when said guide means is in a lifted position from said push means to a conveyor so as to separate and feed single pin sub-assemblies intermittently thereto at a relatively high speed, said last mentioned transfer means including a means for moving said sawn blanks to a position adjacent the conveyor and a second means for feeding said pin assemblies to said conveyor.

7. In a machine for forming clothes pins or the like, blank feeding means, blank saw means for sawing said blanks into a plurality of clothes pin sub-assemblies intermittently at a relatively slow speed, blank push means for receiving said blanks from said feeding means and moving said blanks through said saw means, means co-operating with said push means to exert pressure on said blanks during movement thereof through said saw means, means to release said pressure means at the end of the sawing operation, and means to transfer said sawn blanks while said pressure is released from said push means to a conveyor so as to separate and feed pin sub-assemblies intermittently thereto at a relatively high speed, said last mentioned transfer means including means for moving said sawn blanks to a position adjacent said conveyor and a second means for feeding said pin assemblies to said conveyor.

8. In a machine for forming a clothes pin or the like, a supporting table, a conveyor positioned adjacent said table and moving longitudinally thereof, a plurality of saws positioned in said table in transversely spaced relation to said conveyor and rotatable in general parallelism with said conveyor, a magazine for blank assemblies positioned upon said table and spaced transversely and longitudinally from said saws, a first transfer means for moving blanks transversely of said table into alignment with said saws, a second transfer means for moving said blanks longitudinally of said table and through said saws, and a third transfer means for moving said sawn blanks transversely of said table and feeding sawn blanks to said conveyor.

9. In a machine for forming a clothes pin or the like, a supporting table, a conveyor positioned adjacent said table and moving longitudinally thereof, a plurality of saws positioned in said table in transversely spaced relation to said conveyor and rotatable in general parallelism with said conveyor, a magazine for blank assemblies positioned upon said table and spaced transversely and longitudinally from said saws, first transfer means for moving blanks transversely of said table into alignment with said saws, a second transfer means for moving said blanks longitudinally of said table and through said saws, and a third transfer means for moving said sawn blanks transversely of said table and feeding sawn blanks to said conveyor, said second transfer means including means to push said blank assemblies through said saws under downward pressure of said push means, means to lift said push means and means to move said push means rearwardly in lifted position, said means to lift and means to move said push means being operative in time relation to said first and third transfer means so that operative movement of said first and third transfer means occurs while said push means is in rearward lifted position and forward lifted position, respectively.

10. In a transfer mechanism for clothes pin sub-assemblies or the like, said sub-assemblies each comprising a pair of clothes pin parts in face-to-face relation, a conveyor for moving a continuous succession of sub-assemblies in end-to-end relation, a feed member including a portion engaging a predetermined number of said sub-assemblies in side-to-side relation and exerting a relatively constant pressure against said sub-assemblies for feeding said sub-assemblies into said conveyor, and a second feed member for feeding a predetermined number of sub-assemblies in side-to-side relation into position to be engaged by said first feed member.

11. In a transfer mechanism for clothes pin sub-assemblies or the like, said sub-assemblies each comprising a pair of clothes pin parts in face-to-face relation, a conveyor for continuously moving a plurality of separated sub-assemblies in end-to-end relation, a feed member extending over said conveyor and having a downwardly extending portion for engaging at least one of said sub-assemblies and urging the same transversely into said conveyor, and a second feed member for feeding a plurality of said sub-assemblies in side-by-side relation adjacent said conveyor into position to be engaged by said first feed member.

12. In a transfer mechanism for clothes pin sub-assemblies or the like, said sub-assemblies each comprising a pair of clothes pin parts in face-to-face relation, a conveyor for continuously moving a plurality of sub-assemblies in end-to-end relation, a feed member including a portion engaging said sub-assemblies at the side and exerting a relatively constant pressure against said sub-assemblies for feeding said sub-assemblies from the side into said conveyor, a second feed member for feeding a plurality of said sub-assemblies into position to be engaged by said first feed member, and means cooperating with said first and second feed members for rendering said first feed member inoperative during the feeding movement of said second feed member.

13. In a transfer mechanism for clothes pin sub-assemblies or the like, said sub-assemblies each comprising a pair of clothes pin parts in face-to-face relation, a conveyor for continuously moving a plurality of separated sub-assemblies in end-to-end relation, a feed member extending over said conveyor and having a downwardly extending portion for engaging at least one of said sub-assemblies at the side and feeding said sub-assemblies sideways into said conveyor, a second feed member for feeding a plurality of sub-assemblies into position to be engaged by the downwardly extending portion of said first feed member, and means cooperating with said first and second feed members for lifting said downwardly extending portion of said first feed member during sideways feeding movement of said second feed member.

14. In a transfer mechanism for clothes pin sub-assemblies or the like, said sub-assemblies each comprising a pair of clothes pin parts in face-to-face relation, a conveyor for continuously moving a plurality of sub-assemblies in end-to-end relation, a feed member including a portion engaging said sub-assemblies and movable transversely of said conveyor for engaging said sub-assemblies at the side and movable transversely of said conveyors for moving said sub-assemblies toward said conveyor, a second feed member movable transversely of said conveyor and in alignment with said first feed member for feeding a plurality of said sub-assemblies sideways into position to be engaged by said first feed member, and spring means yieldably urging said sub-assembly engaging portion of said first feed member into engagement with said sub-assemblies.

15. In a transfer mechanism for clothes pin sub-assemblies or the like, said sub-assemblies each comprising a pair of clothes pin parts in face-to-face relation, a conveyor for continuously moving a plurality of sub-assemblies in end-to-end relation, a feed member including a portion engaging said sub-assemblies at the side and movable transversely of said conveyor for moving said sub-assemblies sideways towards said conveyor, a second feed member movable transversely of said conveyor and in alignment with said first feed member for feeding a plurality of said sub-assemblies sideways into position to be engaged by said first feed member, cam means movable with said second feed member, and means movable with said first feed member and cooperating with said cam means for moving said first feed member into inoperative position during the feeding movement of said second feed member.

16. In a transfer mechanism for clothes pin sub-assemblies or the like, said sub-assemblies each comprising a pair of clothes pin parts in face-to-face relation, a conveyor, a feed member extending over said conveyor and having a downwardly extending portion for engaging at least one of said sub-assemblies at the side and feeding said sub-assembly sideways into said conveyor, a second feed member for feeding a plurality of said sub-assemblies into position to be engaged at the side by the downwardly extending portion of said first feed member, cam means movable with said second feed member, and means on said first feed member cooperating with said cam means for lifting said downwardly extending portion of said first feed member to permit movement of a plurality of said sub-assemblies into position to be engaged by said downwardly extending portion of said first feed member.

References Cited in the file of this patent

UNITED STATES PATENTS

| | | |
|---|---|---|
| 16,923 | Humphrey | Mar. 31, 1857 |
| 323,453 | Senate | Aug. 4, 1885 |
| 352,850 | Beasley | Nov. 16, 1886 |
| 355,557 | Sands | Jan. 4, 1887 |
| 406,274 | Fensom | July 2, 1889 |
| 408,863 | Van Houten | Aug. 13, 1889 |
| 432,976 | Carver | July 29, 1890 |
| 621,488 | Clarke | Mar. 21, 1899 |
| 806,487 | Parker | Dec. 5, 1905 |
| 811,377 | Cleveland | Jan. 30, 1906 |
| 1,141,501 | Stock | June 1, 1915 |
| 1,305,921 | Mims | June 3, 1919 |
| 1,342,144 | Winkley | June 1, 1920 |
| 1,428,036 | Johnson | Sept. 5, 1922 |
| 1,487,649 | Foreman | Mar. 18, 1924 |
| 1,616,641 | Tainter | Feb. 8, 1927 |
| 1,638,310 | Killebrew | Aug. 9, 1927 |
| 1,736,641 | Zimmerman | Nov. 19, 1929 |
| 1,783,997 | Burden et al. | Dec. 9, 1930 |
| 1,830,021 | Forney | Nov. 3, 1931 |
| 2,522,965 | Schaufelberger | Sept. 19, 1950 |

FOREIGN PATENTS

| | | |
|---|---|---|
| 111,488 | Australia | Sept. 6, 1940 |
| 111,489 | Australia | Sept. 6, 1940 |